(12) United States Patent
Yousaf et al.

(10) Patent No.: US 10,740,342 B2
(45) Date of Patent: *Aug. 11, 2020

(54) SYSTEMS, METHODS, USER INTERFACES AND ALGORITHMS FOR PERFORMING DATABASE ANALYSIS AND SEARCH OF INFORMATION INVOLVING STRUCTURED AND/OR SEMI-STRUCTURED DATA

(71) Applicant: Palantir Technologies Inc., Palo Alto, CA (US)

(72) Inventors: Timothy Yousaf, New York, NY (US); Alexander Mark, New York, NY (US); Sharon Hao, San Jose, CA (US); David Cohen, Mountain View, CA (US); Andrew Elder, Cherry Hills Village, CO (US); Daniel Lidor, Washington, DC (US); Joel Ossher, Vienna, VA (US); Christopher Richbourg, Arlington, VA (US); Joshua Zavilla, Washington, DC (US); Kevin Zhang, Palo Alto, CA (US)

(73) Assignee: Palantir Technologies Inc., Palo Alto, CA (US)

(*) Notice: Subject to any disclaimer, the term of this patent is extended or adjusted under 35 U.S.C. 154(b) by 270 days.

This patent is subject to a terminal disclaimer.

(21) Appl. No.: 15/859,167

(22) Filed: Dec. 29, 2017

(65) Prior Publication Data

US 2018/0121524 A1    May 3, 2018

Related U.S. Application Data

(63) Continuation of application No. 15/253,676, filed on Aug. 31, 2016, now Pat. No. 9,881,066.

(51) Int. Cl.
*G06F 16/24* (2019.01)
*G06F 16/248* (2019.01)
*G06F 3/0482* (2013.01)

(52) U.S. Cl.
CPC .......... *G06F 16/248* (2019.01); *G06F 3/0482* (2013.01)

(58) Field of Classification Search
CPC .... G06F 16/248; G06F 16/24; G06F 16/3323; G06F 3/0482

(Continued)

(56) References Cited

U.S. PATENT DOCUMENTS 5,632,009 A    5/1997   Rao et al.
6,456,997 B1   9/2002   Shukla
(Continued)

FOREIGN PATENT DOCUMENTS

AU    2014250678    2/2016
EP    1672527       6/2006
(Continued)

OTHER PUBLICATIONS

Notice of Allowance for U.S. Appl. No. 15/253,676 dated Sep. 21, 2017.

(Continued)

*Primary Examiner* — Hares Jami
(74) *Attorney, Agent, or Firm* — Knobbe Martens Olson & Bear LLP

(57) ABSTRACT

Implementations for searching and analyzing large, object-oriented data sets in an efficient manner involving innovative user interface features and/or search algorithm functionality are disclosed. In one exemplary embodiment, a system may search for information and/or relationships based on specified search criteria and return results that may be displayed dynamically and further filtered or analyzed.

(Continued)

Systems may involve object oriented database(s) and a software layer including a specialized user interface between the user and the database(s). The user interface may comprise various tools as well as predefined and configurable features that enable effective search of the data as well as display of search results that are configurable and readily managed to provide immediate and useful search results. The user interface may display the search results and various associated graphical representations and models, and/or provide tools enabling dynamic manipulation and display of search results or underlying object models, among other things.

20 Claims, 25 Drawing Sheets

(58) Field of Classification Search
USPC .............. 707/705, 722, 736, 754, 758, 769
See application file for complete search history.

(56) References Cited

U.S. PATENT DOCUMENTS

| | | |
|---|---|---|
| 6,594,672 B1 | 7/2003 | Lampson et al. |
| 6,980,984 B1 | 12/2005 | Huffman et al. |
| 7,451,397 B2 | 11/2008 | Weber et al. |
| 7,461,077 B1 | 12/2008 | Greenwood |
| 7,657,540 B1 | 2/2010 | Bayliss |
| 7,899,796 B1 | 3/2011 | Borthwick et al. |
| 7,900,052 B2 | 3/2011 | Jonas |
| 7,941,321 B2 | 5/2011 | Greenstein et al. |
| 7,971,150 B2 | 6/2011 | Raskutti et al. |
| 8,196,184 B2 | 6/2012 | Amirov et al. |
| 8,290,926 B2 | 10/2012 | Ozzie et al. |
| 8,423,567 B1 | 4/2013 | Finneran et al. |
| 8,489,623 B2 | 7/2013 | Jain et al. |
| 8,554,709 B2 | 10/2013 | Goodson et al. |
| 8,583,673 B2 | 11/2013 | Tarek et al. |
| 8,595,234 B2 | 11/2013 | Siripuapu et al. |
| 8,639,757 B1 | 1/2014 | Zang et al. |
| 8,676,857 B1 | 3/2014 | Adams et al. |
| 8,787,939 B2 | 7/2014 | Papakipos et al. |
| 8,812,960 B1 | 8/2014 | Sun et al. |
| 9,069,842 B2 | 6/2015 | Melby |
| 9,116,975 B2 | 8/2015 | Shankar et al. |
| 9,146,954 B1 | 9/2015 | Boe et al. |
| 9,229,952 B1 | 1/2016 | Meacham et al. |
| 9,348,920 B1 | 5/2016 | Kesin |
| 9,881,066 B1 | 1/2018 | Yousaf et al. |
| 2002/0083039 A1 | 6/2002 | Ferrari |
| 2002/0095658 A1 | 7/2002 | Shulman |
| 2003/0036848 A1 | 2/2003 | Sheha et al. |
| 2003/0172014 A1 | 9/2003 | Quackenbush et al. |
| 2003/0229848 A1 | 12/2003 | Arend et al. |
| 2004/0032432 A1 | 2/2004 | Baynger |
| 2004/0054685 A1* | 3/2004 | Rahn ................. G06Q 40/02 |
| 2004/0111410 A1 | 6/2004 | Burgoon et al. |
| 2004/0163039 A1 | 8/2004 | Gorman |
| 2004/0193600 A1 | 9/2004 | Kaasten et al. |
| 2004/0205524 A1 | 10/2004 | Richter et al. |
| 2005/0065811 A1 | 3/2005 | Chu et al. |
| 2005/0078858 A1 | 4/2005 | Yao et al. |
| 2005/0102284 A1 | 5/2005 | Srinivasan et al. |
| 2005/0154628 A1 | 7/2005 | Eckart et al. |
| 2005/0154769 A1 | 7/2005 | Eckart et al. |
| 2006/0074881 A1 | 4/2006 | Vembu et al. |
| 2006/0184889 A1 | 8/2006 | Molander |
| 2006/0209085 A1 | 9/2006 | Wong et al. |
| 2006/0242040 A1 | 10/2006 | Rader |
| 2007/0130206 A1 | 6/2007 | Zhou et al. |
| 2007/0150369 A1 | 6/2007 | Zivin |
| 2007/0192265 A1 | 8/2007 | Chopin et al. |
| 2007/0208736 A1 | 9/2007 | Tanigawa et al. |
| 2008/0040275 A1 | 2/2008 | Paulsen et al. |
| 2008/0071731 A1 | 3/2008 | Ma et al. |
| 2008/0104542 A1 | 5/2008 | Cohen et al. |
| 2008/0162616 A1 | 7/2008 | Gross et al. |
| 2008/0177735 A1 | 7/2008 | Garbow et al. |
| 2008/0243777 A1* | 10/2008 | Stewart ................. G06F 16/36 |
| 2008/0249983 A1 | 10/2008 | Meisels et al. |
| 2009/0024589 A1 | 1/2009 | Sood et al. |
| 2009/0055251 A1 | 2/2009 | Shah et al. |
| 2009/0150854 A1 | 6/2009 | Elaasar et al. |
| 2009/0177988 A1 | 7/2009 | Martins |
| 2009/0192957 A1 | 7/2009 | Subramanian et al. |
| 2009/0327208 A1 | 12/2009 | Bittner et al. |
| 2010/0030722 A1 | 2/2010 | Goodson et al. |
| 2010/0114887 A1 | 5/2010 | Conway et al. |
| 2010/0228812 A1 | 9/2010 | Uomini |
| 2010/0306029 A1 | 12/2010 | Jolley |
| 2010/0325526 A1 | 12/2010 | Ellis et al. |
| 2011/0004498 A1 | 1/2011 | Readshaw |
| 2011/0029526 A1 | 2/2011 | Knight et al. |
| 2011/0055246 A1 | 3/2011 | Le Biannic et al. |
| 2011/0078055 A1 | 3/2011 | Faribault et al. |
| 2011/0131547 A1 | 6/2011 | Elaasar |
| 2011/0161137 A1 | 6/2011 | Ubalde et al. |
| 2011/0173032 A1 | 7/2011 | Payne et al. |
| 2011/0181598 A1 | 7/2011 | O'Neall et al. |
| 2011/0219321 A1 | 9/2011 | Gonzalez et al. |
| 2011/0258158 A1 | 10/2011 | Resende et al. |
| 2011/0258190 A1 | 10/2011 | Chen et al. |
| 2011/0289407 A1 | 11/2011 | Naik et al. |
| 2011/0289420 A1 | 11/2011 | Morioka et al. |
| 2012/0004904 A1 | 1/2012 | Shin et al. |
| 2012/0036013 A1 | 2/2012 | Neuhaus et al. |
| 2012/0075324 A1 | 3/2012 | Cardno et al. |
| 2012/0116828 A1 | 5/2012 | Shannon |
| 2012/0117082 A1 | 5/2012 | Koperda et al. |
| 2012/0159312 A1 | 6/2012 | Mital et al. |
| 2012/0170847 A1 | 7/2012 | Tsukidate |
| 2012/0197651 A1 | 8/2012 | Robinson et al. |
| 2012/0203708 A1 | 8/2012 | Psota et al. |
| 2012/0221553 A1 | 8/2012 | Wittmer et al. |
| 2012/0245976 A1 | 9/2012 | Kumar et al. |
| 2012/0278273 A1 | 11/2012 | Fang |
| 2012/0296907 A1 | 11/2012 | Long et al. |
| 2013/0006916 A1 | 1/2013 | McBride et al. |
| 2013/0046635 A1 | 2/2013 | Grigg et al. |
| 2013/0050217 A1 | 2/2013 | Armitage |
| 2013/0073454 A1 | 3/2013 | Busch |
| 2013/0110822 A1 | 5/2013 | Ikeda et al. |
| 2013/0117011 A1 | 5/2013 | Ahmed et al. |
| 2013/0151148 A1 | 6/2013 | Parundekar et al. |
| 2013/0157234 A1 | 6/2013 | Gulli et al. |
| 2013/0267207 A1 | 10/2013 | Hao et al. |
| 2013/0304770 A1 | 11/2013 | Boero et al. |
| 2013/0311375 A1 | 11/2013 | Priebatsch |
| 2014/0067611 A1 | 3/2014 | Adachi et al. |
| 2014/0082012 A1 | 3/2014 | Pichumani et al. |
| 2014/0095273 A1 | 4/2014 | Tang et al. |
| 2014/0108068 A1 | 4/2014 | Williams |
| 2014/0129261 A1 | 5/2014 | Bothwell et al. |
| 2014/0156527 A1 | 6/2014 | Grigg et al. |
| 2014/0258246 A1 | 9/2014 | Lo Faro et al. |
| 2014/0310266 A1 | 10/2014 | Greenfield |
| 2014/0316911 A1 | 10/2014 | Gross |
| 2014/0330845 A1 | 11/2014 | Feldschuh |
| 2014/0351070 A1 | 11/2014 | Christner et al. |
| 2014/0379755 A1 | 12/2014 | Kuriakose et al. |
| 2015/0019394 A1 | 1/2015 | Unser et al. |
| 2015/0073929 A1 | 3/2015 | Psota et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0186478 A1 | 7/2015 | Yan et al. |
| 2015/0220638 A1 | 8/2015 | Motoyama et al. |
| 2015/0294013 A1* | 10/2015 | Ozer ................. G06F 16/26 |
| | | 707/754 |
| 2015/0324868 A1 | 11/2015 | Kaftan et al. |
| 2015/0347903 A1 | 12/2015 | Saxena et al. |
| 2015/0378996 A1 | 12/2015 | Kesin et al. |

(56) References Cited

U.S. PATENT DOCUMENTS

| | | | |
|---|---|---|---|
| 2016/0004667 | A1 | 1/2016 | Chakerian et al. |
| 2016/0034545 | A1 | 2/2016 | Shankar et al. |
| 2016/0098173 | A1 | 4/2016 | Slawinski et al. |

FOREIGN PATENT DOCUMENTS

| | | |
|---|---|---|
| EP | 2863326 | 4/2015 |
| EP | 2884439 | 6/2015 |
| EP | 2884440 | 6/2015 |
| EP | 3037992 | 6/2016 |
| WO | WO 2002/065353 | 8/2002 |
| WO | WO 2010/098958 | 9/2010 |

OTHER PUBLICATIONS

Official Communication for U.S. Appl. No. 15/253,676 dated Mar. 15, 2017.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Bluttman et al., "Excel Formulas and Functions for Dummies," 2005, Wiley Publishing, Inc., pp. 280, 284-286.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Jelen, Bill, "Excel 2013 in Depth, Video Enhanced Edition," Jan. 25, 2013.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Palantir Technologies, "Palantir Labs—Timeline," Oct. 1, 2010, retrieved from the internet https://www.youtube.com/watch?v=JCgDW5bru9M retrieved on Aug. 19, 2015.
Palmas et al., "An Edge-Bunding Layout for Interactive Parallel Coordinates" 2014 IEEE Pacific Visualization Symposium, pp. 57-64.
Vose et al., "Help File for ModelRisk Version 5," 2007, Vose Software, pp. 349-353. [Uploaded in 2 Parts].
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Mobile Web," Jan. 23, 2015, retrieved from the internet on Mar. 15, 2016 https://en.wikipedia.org/w/index.php?title=Mobile_Web&oldid=643800164.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Notice of Allowance for U.S. Appl. No. 13/247,987 dated Mar. 17, 2016.
Notice of Allowance for U.S. Appl. No. 14/320,236 dated Jun. 29, 2016.
Notice of Allowance for U.S. Appl. No. 14/326,738 dated Nov. 18, 2015.
Notice of Allowance for U.S. Appl. No. 14/504,103 dated May 18, 2015.
Notice of Allowance for U.S. Appl. No. 14/923,364 dated May 6, 2016.
Notice of Allowance for U.S. Appl. No. 14/948,009 dated May 6, 2016.
Official Communication for European Patent Application No. 14189344.6 dated Feb. 20, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 15165244.3 dated Aug. 27, 2015.
Official Communication for European Patent Application No. 15166137.8 dated Sep. 14, 2015.
Official Communication for European Patent Application No. 16152984.7 dated Mar. 24, 2016.
Official Communication for New Zealand Patent Application No. 622513 dated Apr. 3, 2014.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Jun. 3, 2016.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Feb. 1, 2016.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.

(56) References Cited

OTHER PUBLICATIONS

Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/645,304 dated Jan. 25, 2016.
Official Communication for U.S. Appl. No. 14/874,690 dated Jun. 1, 2016.
Official Communication for U.S. Appl. No. 14/874,690 dated Dec. 21, 2015.
Official Communication for U.S. Appl. No. 14/948,009 dated Feb. 25, 2016.

\* cited by examiner

FIG. 3B

| ACCT HOLDER NAME | TRANSACTION DATE | ASSET | DESCRIPTION | AMOUNT |
|---|---|---|---|---|
| Dianna Yundt | 2016-01-11 | ABCDE | Withdraw | $ X |
| Dr. Krysta Yundt | 2016-01-11 | lorem | Deposit | $ Y |
| Dr. Krysta Yundt | 2016-01-11 | lorem | Transfer | $ Z |
| .... | .... | .... | .... | .... |

FIG. 6A

| ACCT HOLDER NAME | TRANSACTION DATE | ASSET | DESCRIPTION | AMOUNT |
|---|---|---|---|---|
| Dianna Yundt | 2016-01-11 | ABCDE | Withdraw | $ X |
| Dr. Krysta Yundt | 2016-01-11 | lorem | Deposit | $ Y |
| Dr. Krysta Yundt | 2016-01-11 | lorem | Transfer | $ Z |
| ... | ... | ... | ... | ... |

Transactions Account Holder
605A
VIEWING ALL TRADERS
TRANSACTIONS ANALYZE
xxxx results
606

XXXXXX Database

Next Search
Enterprise Search | Transactions Search

601 PERSON NAME
rufus robel    403

602 ENTITY NAME
XXXXXXX

603 FULL TEXT SEARCH
XXXXXXX

604 ENTERPRISE DATA SOURCE
☑ All
☑ AAA   ☑ DDD
☑ ABC   ☑ EEE
☑ BBB   ☑ FFF
☑ CCC

Search

600

XXXXXX Database — 608

Next Search — 609

Enterprise Search: Enterprise Data Source xxxx and person Name xxx

☆ AB-12345
ABC

AB-12345 — 610    WI-9999 — 611
ABC created 2015/01/05    Work item created on ⌕ xxxx results ☐ View printable/sharexxxx version — 615
☐ View highlighted matches — 616

612 {
STATUS                    OPEN
LAST UPDATED
STAGE                     IN PROGRESS
OUTCOME

613 {
ABC Attachments           Work Item Attachments
First Stage Report.pdf    NO matching records found

614 {
SUMMARY OF WORK ITEM ALLEGATIONS

Sed ut oerspiciatis unde omnis iste natus error sit votoptatem accusantium dotoremaue laudantium. totam rem aperiam eaque ipsa quae abillo invwntore et quast architecto beatas vitae dicta sunt explicabe Nemo enim ipsam vetuptatem quia voluptas sit aspernatur aut odil aut fugit. sed quia consequentur magni dotores egs qui catione votuptatem sequi nesciunt Neque porro quisquam est. qui dotorem ipsum quia dotor sit amet consectetur adip sci vellit. sed quia nen xxxx eivs modi terrmpora incident ut fabore et dotore magnam atiquam Quaeral voluptatem UL enim ad minama xxx quis nostrum exercitationem uiitam corporis suscipit laboriosam. nisi ut atiquid ex ea commadi consequatur? Quis autem veteum lore coptcheneri xxx ea votuptats xxx esse quam nihit motestiae consequatur vel illum qui dotorem eum fugiat quo vofuptas nuxx pariatur?

Enterprise Search: Enterprise Data Source xxxx and person Name xxx ✎ xxxx results 640 — (outer page reference)

641 — Left sidebar:
- Next Search ▸▸
- ☆ AB-12345 ABC
- ☆ AB-19878 ABC
- ☆ Test-ABC ABC STATUS FARE
- ☆ Test-ABC ABC
- ☆ AB-19878 ABC
- ☆ Jane Doe ABC
- ☆ AC2 L.P ABC Person Showing first N results — Load More 642 — Person Record: Jane Doe

643 — Identifying Information section:
- OTHER NAMES
- CURRENT EMPLOYER — Jane Doe
- ADDRESS
- Other Information

644 — LIST OF ASSOCIATED ORGANIZATIONS AND TRANSACTIONS

| Date | ID | Organization | Type | Description |
|---|---|---|---|---|
| 1992/11/05 | 442403 | ABC Co. | With Draw | |
| 2005/01/01 | 442402 | XYZ Co. | Deposit | LOREM IPSUM DOLOR SIT AMET, CONSECTETUER ADIPISCING ELIT. AENEAN COMMODO LIGULA EGET DOLOR. AENEAN MASSA. CUM SOCIIS NATOQUE ET MAGNIS DIS PARTURIENT MONTES, NASCETUR. DONEC QUAM FELIS, ULTRICIES NEC, PELLENTESQUE SEM. NULLA CONSEQUAT MASSA QUIS ENIM. DONEC |
| 2012/01/01 | 165962 | TDQ Co. | Transfer | LOREM IPSUM DOLOR SIT AMET, CONSECTETUER ADIPISCING ELIT. AENEAN COMMODO LIGULA EGET DOLOR. AENEAN MASSA. CUM SOCIIS NATOQUE |

☆ 3    View printable/sharexxxx version

SYSTEMS, METHODS, USER INTERFACES AND ALGORITHMS FOR PERFORMING DATABASE ANALYSIS AND SEARCH OF INFORMATION INVOLVING STRUCTURED AND/OR SEMI-STRUCTURED DATA

BACKGROUND

Technical Field

The present disclosure relates to search and analysis of large data sets of database information without knowledge and use of technical database search queries and techniques. More specifically, the present disclosure relates to searching resources and related information arranged as data structures utilizing various user interface and search algorithm functionality that involve aspects of data integration, analysis, and visualization.

Description of Related Information

Individuals or entities may need to search diverse sources and stores of information regarding various criteria and related data. The specific resources and data to be searched often encompass large data sets stored in technical data structures. For example, such large data sets may be arranged in traditional SQL or relational databases that are only accessible via basic user interfaces configured for constructing SQL queries of the data. FIG. 1 illustrates an embodiment of a known SQL database arrangement that may be associated with existing search systems. As illustrated in FIG. 1, such SQL database 100 may include a database server 102, memory 104, instances 106, a database or data store 108, as well as the various memory models 110, process models 112, and storage models 114 that may be involved with searching the underlying data. Individuals who are not technically or analytically trained, such as those investigating large data sets of confidential transactions data, are often tasked with searching and analyzing data within such data structures. However, these individuals are typically unfamiliar with SQL or relational database logic and the technical search queries and techniques required to search such databases, thus need to involve additional technical specialists to search for information desired.

SUMMARY

The systems, methods, and devices described herein each have several aspects, no single one of which is solely responsible for its desirable attributes. Without limiting the scope of this disclosure, several non-limiting features will now be discussed briefly.

Systems and methods that provide search and analysis of large, object-oriented data sets in an efficient manner involving innovative user interface features and search algorithm functionality are disclosed. According to one exemplary embodiment, a system herein may search for information and/or relationships based on specified search criteria and return results that may be displayed dynamically and further filtered or analyzed. The system involves object oriented database(s) and a software layer including a specialized user interface between the user and the database(s). The user interface may comprise various tools as well as predefined and configurable features that enable effective search of the data as well as display of search results that are configurable and readily managed to provide immediate and useful search results. The user interface displays the search results and various graphical representations and models associated with the search results. The user interface may also provide tools enabling dynamic manipulation and display of search results and/or underlying object models, as well as additional functionality to further filter initial search results.

According to present embodiments, computer systems herein may be configured to provide an interactive user interface and process one or more data sets in response to inputs received via the interactive user interface in order to search and analyze data, such as transaction data, within one or more databases. In one embodiment, a computer system is disclosed comprising: one or more hardware computer processors configured to execute software code stored in a tangible storage device in order to cause the system to: process data involving a user interface that is configured to enable processing and handling of information between a user and the database, the database containing organized information including at least one of object oriented or relationally-structured information associated with the transaction data; provide interactive user interface tools in the user interface including at least one of graphical input fields or indicia that enable a user to perform at least one of predefined or customizable searches of the transaction data as a function of one or more search queries; and update the user interface responsive to the user searches, wherein the user interface is configured to display the transaction data including one or more representations of the organized information within the user interface, the one or more representations of the organized information corresponding to parameters of the transaction data determinable via the one or more search queries. Further, in response to selection of one or more search queries in the user interface, the software code may be executed to: process (e.g., search and/or categorize, etc.) the organized information into at least one subset that meets the one or more search queries; update or generate user interface to display the at least one subset that meets the one or more search queries; and update or provide the one or more representations of the organized information to display the transaction data related to both initial and secondary search queries.

Advantageously, according to various embodiments, the disclosed techniques provide for effective search of large data sets of database information, such as confidential transaction data, by individuals who are not technically trained. An analyst or organization may be able to conduct a search as a function of particular parameters of a data item and/or cluster of related data items, which may reduce the amount of time and effort required to perform a search or investigation.

In order to identify relevant information from within large and diverse sources of data, scalability and efficiency may be important factors in some implementations. Accordingly, various systems, user interfaces and algorithms described herein may provide for scalable and efficient searching of large amounts of data relating to resources and sought information, for example, by using data structures and data objects. For example, the systems and user interfaces can search for resources and/or information by searching through properties of data objects as well as properties of other types of nodes (e.g., reports, information, child objects, parent objects, other data objects, etc.) that are linked to the data objects. The user interfaces may be designed to display large amounts of data in an informative way (e.g., by presenting search results organized according to the data objects or properties of the data objects, in aggregate or other summary manner, or in other ways, and/or by displaying interrelated aspects of the search results in dynamically related user interface panes, etc.) and to interact with users by allowing access to and navigation of varying levels of detail within the same user interface.

In various embodiments, large amounts of data are automatically and dynamically created, processed, and handled interactively in response to user inputs, and the data is efficiently and compactly presented to a user by the system. Thus, in some embodiments, the user interfaces described herein are more efficient as compared to previous user interfaces which require knowledge of technical search querying, and in which data is not dynamically updated and compactly and efficiently presented to the user in response to interactive user interface functionality and inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and/or testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of information relating to resources and/or information associated with the resources, and may enable a user to more quickly access, navigate, assess, and digest such information than previous systems.

Various embodiments of the present disclosure are inextricably tied to computer technology. In particular, various embodiments rely on specific database functionality and data processing including relational database logic, detection of user inputs via graphical user interfaces, determination of updates to displayed electronic data based on those user inputs, automatic processing of electronic data related to resources and information, and presentation of the updates to displayed data relating to resources and information via interactive graphical user interfaces. Such features and others (e.g., searching for resources and information based on properties of respective types of data objects as well as other related data objects, filtering search results using graphical UI functionality, etc.) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In one embodiment, a system configured to access one or more electronic data resources in response to inputs received via an interactive user interface in order to search for information comprises one or more hardware computer processors configured to execute software code stored in a tangible storage device in order to cause the system to: receive search criteria for identifying information associated with one or more databases, the search criteria relating to the resources or the information, the resources and the information represented as respective data objects, wherein data objects can be associated with each other; automatically identify initial search results that meet the search criteria, wherein the identification is based on one or more of: properties of the resources, properties of the information, or properties of other data objects associated with the resources; generate a user interface configured to display the initial search results and attributes associated with the initial search results, the attributes corresponding to the properties of the initial search results, wherein the user interface displays the initial search results on the user interface as well as graphical indicia and/or data related to the initial search results or the attributes associated with the initial search results; and, in response to secondary searching (e.g., selection of one or more of the graphical indicia and/or attributes in the user interface, etc.), filter the identified resources to secondary search results (e.g., a subset of the initial search results, etc.) that meet the secondary search criteria, and/or update the user interface to display the subset that meets the secondary search.

In some embodiments, the search results meet the search criteria or are associated with the identified resources that meet the search criteria. The search criteria for identifying initial and secondary search results may include one or more of: search criteria relating to the resources, data objects and/or information relating to same, and search criteria relating to reports, documents, transaction information, people and/or other information or identifying data associated with same. Some of the search criteria provided and/or displayed may be based on the properties of other data objects associated with the initial resources or data objects searched or identified. The user interface may comprise various panes as set forth below by way of illustration and not limitation. For example, illustrative user interfaced may include a pane for displaying search options and/or resources to search, a pane for displaying the identified resources and/or search results, a pane for displaying information associated with one or more selected resources or search results identified, and/or other panes for displaying manipulations of the search results, data objects associated with the search, and/or data object graphs that may be manipulated by the user. In certain embodiments, the code may be further configured to, in response to inclusion and/or exclusion of one or more attributes in the user interface, filter the identified search results to a second set that meets and/or does not meet such attributes selected; update the user interface to display the secondary set of search results; and update the graphical indicia and/or display information to reflect the data and data objects corresponding to the respective attribute(s) in the secondary search results set.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

FIGS. 3A-3F illustrate various aspects of exemplary search features and associated user interfaces of a search system for searching and analyzing resources and related information, according to certain embodiments.

FIGS. 6A-6F illustrate various aspects of exemplary enterprise search features and associated user interfaces of a search system for searching resources and related information, according to certain embodiments.

DETAILED DESCRIPTION OF SPECIFIC EMBODIMENTS

Terms

Figure 1:
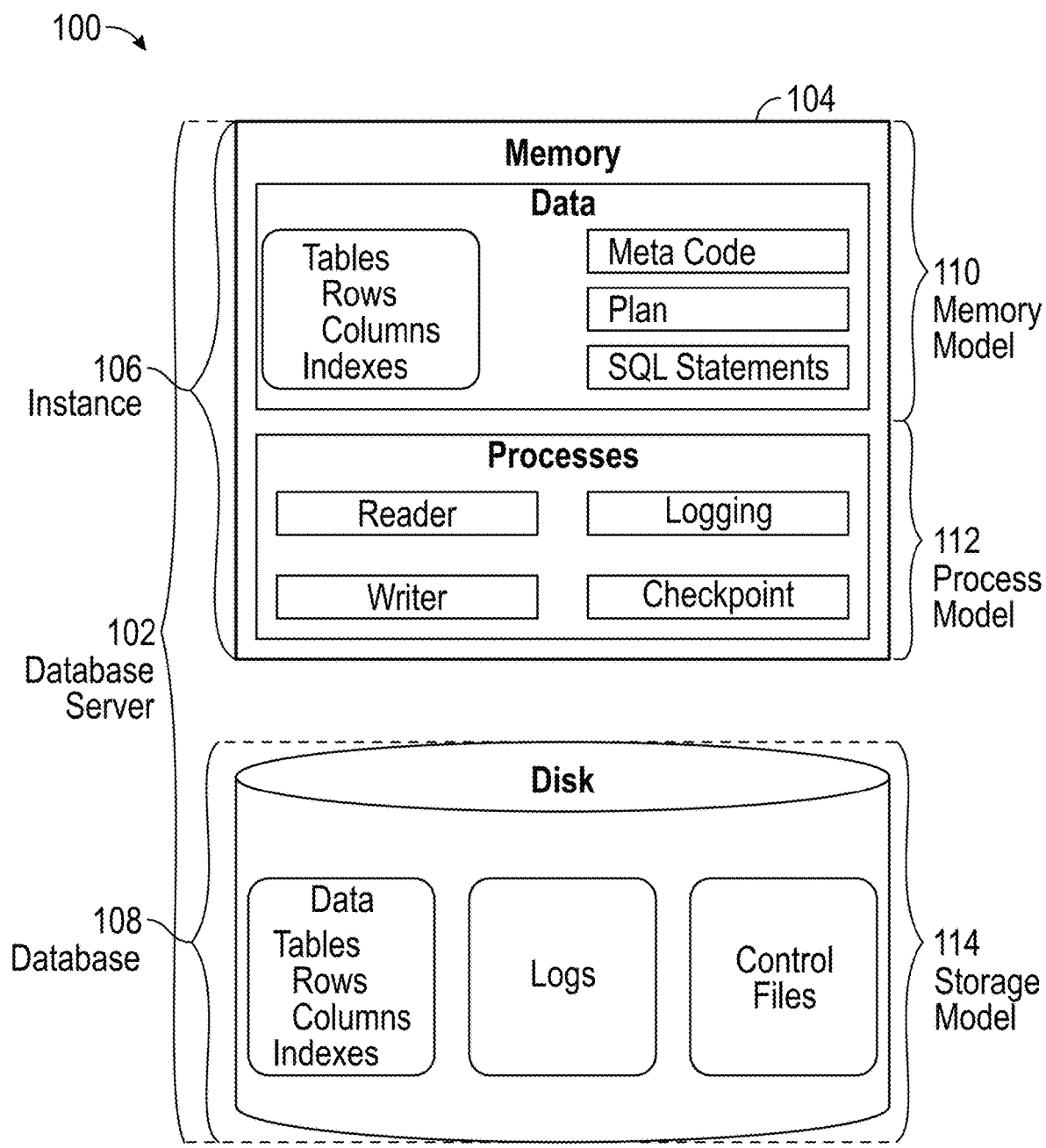
FIG. 1 illustrates an embodiment of a known SQL database arrangement that may be associated with certain existing search systems.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. A "file system" may control how data is stored and/or retrieved (for example, a disk file system like FAT, NTFS, optical discs, etc., a flash file system, a tape file system, a database file system, a transactional file system, a network file system, etc.). For simplicity, the disclosure is described herein with respect to databases. However, the systems and techniques disclosed herein may be implemented with file systems or a combination of databases and file systems.

Data Item (Item), Data Entity (Entity), or Data Object (Object): A data container for information representing specific things in the world that have a number of definable properties. For example, a data item may represent an entity such as an account, a transaction, a person, a place, an organization, a computer, an activity, a market instrument, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The data item's attributes (for example, one or more values of a data item or metadata about the data item) may be represented in one or more properties. The terms "data item," "data object," and "data entity" may be used interchangeably and/or synonymously in the present disclosure.

Item (or Object or Entity) Type: Type of a data item. Example data item types may include Account, Transaction, Person, Event, or Document. Data item types may be defined by an ontology and may be modified or updated to include additional data item types. A data item definition (for example, in an ontology) may include how the data item is related to other data items, such as being a sub-data item type of another data item type (for example, an agent may be a sub-data item of a person data item type), and the properties the data item type may have.

Properties: Attributes of a data item and/or other information associated with a data item. Properties may also be referred to as "metadata." At a minimum, each property of a data item has a property type and a value or values. Properties/metadata associated with data items may include any information relevant to that data item. For example, properties associated with an account data item (e.g., a data item having an item type of "account") may include an account number, an associated customer identifier, an opening date, and/or the like. In another example, a person data item may include a name (for example, John Doe), an address (for example, 123 S. Orange Street), and/or a phone number (for example, 800-0000), among other properties. In another example, metadata associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data items, based on, for example, a relationship, an event, and/or matching properties. Links may be directional, such as one representing a payment from person A to B, or bidirectional.

Link Set: Set of multiple links that are shared between two or more data items.

Overview

As mentioned above, according to various embodiments, a data search and analysis system (the "system") is disclosed that provide search and analysis of large, object-oriented data sets in an efficient manner via innovative user interface features and search algorithm functionality. For example, a system herein may search for information and/or relationships based on specified search criteria and return results that may be displayed dynamically and further filtered or analyzed. The system may involve an object oriented database and a software layer including a specialized user interface between the user and the database(s). The user interface may comprise various tools as well as predefined and configurable features that enable effective search of the data as well as display of search results that are configurable and readily managed to provide immediate and useful search results. The user interface may display the search results and various graphical representations and models associated with the search results. The user interface may also provide tools enabling dynamic manipulation and display of search results and/or underlying object models, as well as additional functionality to further filter initial search results.

In some cases, a person or organization may want to search relevant resources regarding transactions or activities by individuals or organizations. Such organizations may be any entity, such as a company, a school, etc. The resources and data to be searched may be arranged as data objects and may have related information, such as reports, transactions, people, identifying data (e.g., name, address, account or transaction identifiers, phone numbers, email addresses, etc.), documents, etc., associated with them. Previous systems may store data about such information and data objects (or other information relating thereto), but may not provide any way to search the resources and information in an effective manner. Accordingly, it is advantageous to provide the present systems and methods, inter alia, to search resources and/or related information in an efficient manner.

In order to address these and other challenges, disclosed herein are various systems and methods for searching resources and related information using data structures, which may be enabled by innovative, interactive user interfaces. According to certain aspects, a search system can provide integrated searching of resources and information associated with resources, for example, based on search criteria relating to resources and/or other parameters associated with search results or the information desired. Resources and other information searched and/or displayed may be represented by respective types of data objects, and each type of data object may have one or more properties associated with the type. After receiving search criteria (e.g., from a user), the system can search the properties of resource data objects and/or other data objects in order to identify resources and/or results that meet the search criteria. The system may also use other types of data objects that can be associated with the initial resources and/or data objects analyzed, and in such case, the system can also perform searching as a function of the properties of such other types of data objects. By allowing the search criteria to relate to different types of data, the system can provide thorough search results.

Here, by way of example, illustrative search systems and methods may run federated searches against two data sources, for example, an elastic search cluster or database and another database, such as an object-oriented or object model database.

Systems may display the search results in a user interface, for example, in order to provide an overview of the resources and related information. The user interface can be organized in a way that makes it easy for users to process or understand large amounts of data and obtain relevant information in a manner that is both readily comprehendible and usable. For example, the user interface can display resources, search results, associated and/or aggregated information, and/or graphical indicia including object model graphs in various interrelated panes, which may also be tiered and/or toggled between. The user interface may also display specific information about selected data in corresponding panes, such as in response to user input. In these and other ways, the system can provide a dynamic user interface including panes that enable dynamic and useful display of search results and related information to advance the search process and thereby yield meaningful search results. The user interface can also allow users to navigate information at different levels within the same user interface. For example, in response to user input, the user interface may present details about a particular data object, report, or other related data within the same interface. The user interface may also allow users to create new objects, integrate or aggregate search results, and/or add new resources within the same user interface.

In such ways, the present systems and method enable searching for desired results in a dynamic yet straightforward manner that avoids existing problems. Unlike previous systems, for example, systems and methods herein can automatically analyze data objects and related information for display and provide tools to readily perform initial and secondary searches of same. The system can also provide valuable displays, aggregations, summaries, and/or manipulations of the underlying information, for example, as explained in connection with the figures below. The system can provide an efficient way of searching for relevant resources and information. Certain details relating to these and other innovations are explained below, for example, in connection with FIGS. 2-13.

Figure 2:
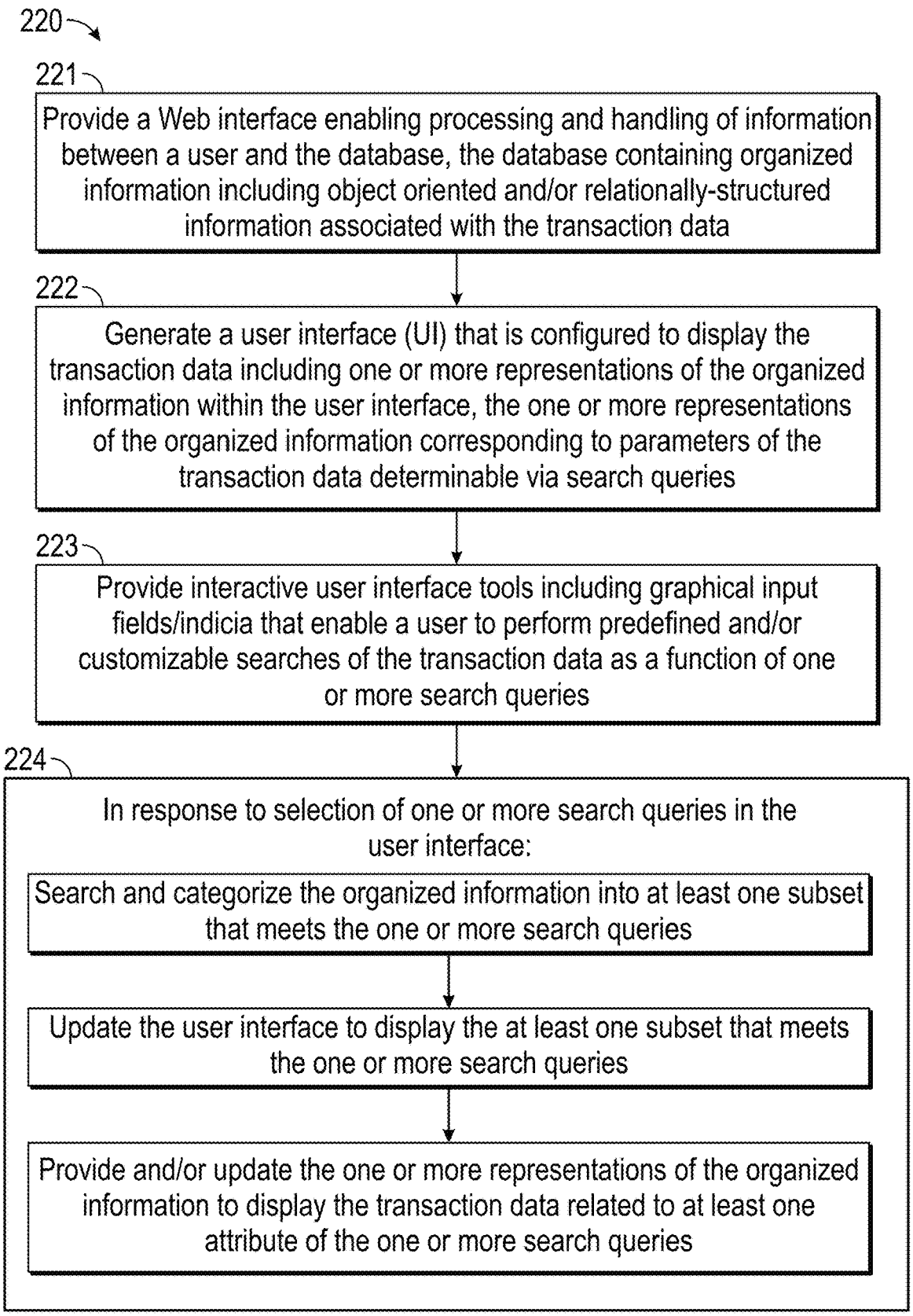
FIG. 2 illustrates a flowchart for searching and/or analyzing resources such as databases and related information, according to certain embodiments.

FIG. 2 illustrates an exemplary flowchart 220 associated with searching and/or analyzing resources and/or information, such as those involving data structures, according to one or more embodiments consistent with aspects of the present innovations. While the examples of FIGS. 2-13 may refer to transaction data as the data being processed, other types of data may be searched and analyzed consistent with the present innovations. As detailed in FIG. 2, in an initial step 221, a Web interface may be provided to enable processing and handling of information between a user and one or more data stores or databases to be searched, wherein such data stores or databases may contain organized information including object oriented and/or relationally-structured information associated with transaction data to be searched. Next, at 222, a user interface is generated that is configured to display the transaction data including one or more representations of the organized information within the user interface, the one or more representations of the organized information corresponding to parameters of the transaction data determinable via search queries, Then, at 223, interactive user interface tools may be provided, including graphical input fields and/or indicia that enable a user to perform predefined and/or customizable searches of the transaction data as a function of one or more search queries. Finally, at 224, in response to selection of one or more search queries in the user interface, various processing may be performed. For example, the organized information may be searched and categorized into at least one subset that meets the one or more search queries, the user interface may be generated and/or populated to display the at least one subset that meets the one or more search queries, and the one or more representations of the organized information may be provided and/or updated to display the transaction data related to at least one attribute of the one or more search queries.

Exemplary User Interfaces of the Search System

FIGS. 3A-3F illustrate various aspects involving exemplary search features and associated user interfaces of a search system, according to certain implementations herein.

Figure 3A:
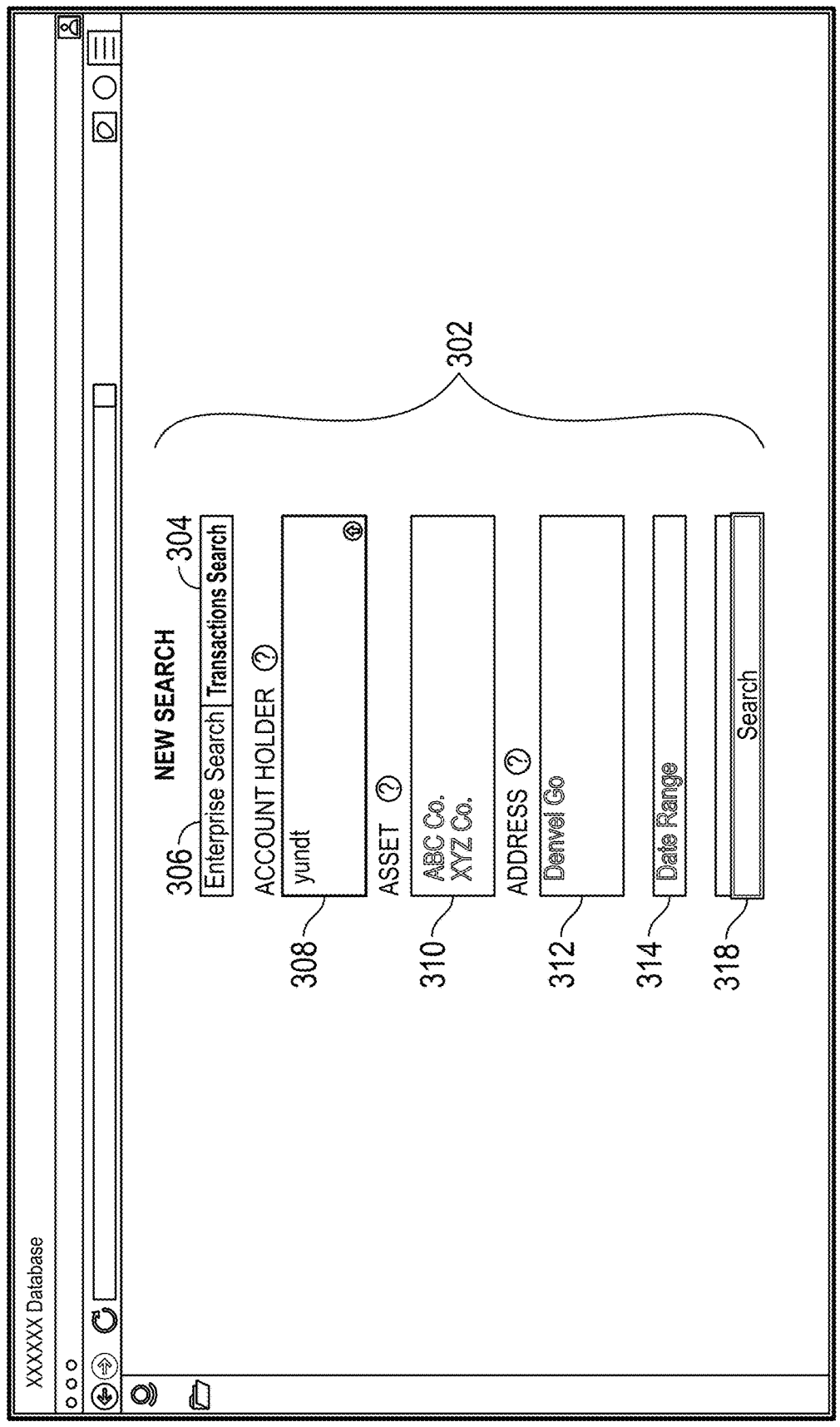

FIG. 3A illustrates a user interface 300 that displays an exemplary search portal providing various search fields and options including a 'transaction search' tab 304 and an 'enterprise search' tab 306. As detailed in FIG. 3A, the user interface 300 illustrates various search fields and options 302 for the transaction search tab 304 selected, as shown in bold. The transaction search tab 304 and associated functionality may be configured to perform searching on transaction data stored, for example, in tabular format in backend servers, memory, and/or resources. In one embodiment, illustrative search systems and methods may run federated searches against two (or more) data sources including, for example, an elastic search cluster or database and another database, such as an object-oriented or object model database.

Additional features, such as searching via the enterprise search tab 306 and its associated functionality may also, optionally, be generated and provided via such a portal. Here, for example, such enterprise search tab 306 may provide user functionality for searching across several different data sets, such as information from existing databases, summaries, reports, searches or investigations, as explained in more detail in connection with FIGS. 6A-6F.

Turning to the details of FIG. 3A, the transaction search tab 304 provides a user with specified (e.g., pre-set, etc.) or user-configurable query fields 302, which enable the user to enter various criteria or queries to be searched against the available information, such as sources of transactions data. In the embodiment shown in FIG. 3A, for example, the query fields 302 may include an account holder field 308, an asset field 310 (e.g., name, symbol, etc.), an address or other geographic- or location-related field 312, a date field 314, and a search button 318. Further, criteria and queries entered into these fields may be searched against the tabular transaction data and/or columns of data within the databases. According to certain implementations, for example, a search submission may dynamically search several different columns of potentially matching data from the databases, such as several different name columns and a social security number column. In some embodiments, the searches may be disjunctive (i.e., searched via "or" operation) within a field and conjunctive (i.e., searched via "and" operation) across the query fields 302.

With regard to an illustrative search process, if transaction data regarding an account holder is desired, the user may enter the person's name, social security number or other identifying information in the account holder field 308. Here, for example, if the user enters last name 'Yundt' in the account holder field 308 and selects the search button 318, transaction data matching or corresponding to this search query will be displayed on the ensuing search results page. FIG. 3B illustrates a user interface 320 that displays such a search results page, including a list of results (i.e., matches) 326, 328 on the left hand side as well as search information 330A of one or more results selected from this list on the right hand side. Here, for example, search information may be provided for just 'Dianna Yundt' 328, or for all results 324 or individuals shown in the list of results, namely Krysta Yundt 326 and Dianna Yundt 328 shown for purposes of illustration, here. As such, the search information 330A may cover the search results for all account holders 332 and may include the whole table of transactions 338 pulled from the tabular transaction data derived from the search criteria. In some embodiments, search results may be further developed by performing aggregation over the whole table of results as a function of a parameter associated with the search criteria or query. The parameter used to perform such aggregation is a parameter selected or calculated to provide the most useful results. Options may also be provided to view and further search transaction information via a transactions button 334, or perform additional analysis via an analyze button 336.

Figure 3C:
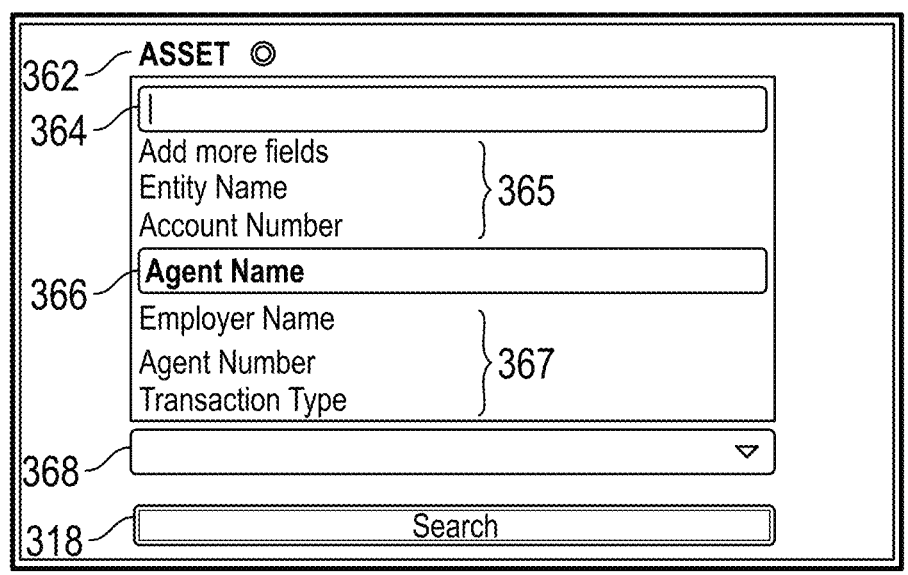

FIG. 3C illustrates a particular user interface (UI) menu 360 corresponding to the asset field 310 shown in FIG. 3A, according to an embodiment herein. The UI menu 360 illustrated in FIG. 3C may comprise a specialized asset drop down menu 362 that includes various specific search criteria 365, 366, 367, one of which (an agent name associated with the transaction 366) being shown as selected by the user. The text for the search criteria selected by the user, here, may then be entered into a text box 364, such as at the top of the drop down menu. In some implementations, the options provided in the drop down menu may be predefined, although additional functionality to customize the list of options in the menu may be included, such as by providing the option to 'add more fields' by user input or selection, such as via an option in a drop down menu (365, top) and/or via a dedicated drop down menu or button 368, to customize or add more fields to be searched. According to one embodiment, a novel asset drop down menu 360 may comprise various permutations of specific search criteria, namely selections for account number, agent name, employer name, agent number, and transaction type.

Figure 3D:
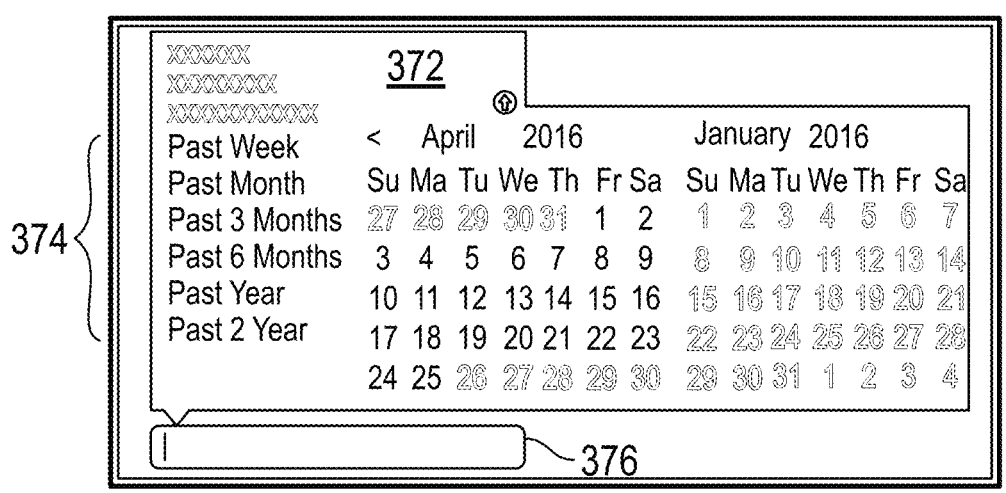

FIG. 3D illustrates a particular user interface (UI) menu 370 corresponding to the date field 314 shown in FIG. 3A, according to an embodiment herein. As illustrated in FIG. 3D, various calendar and graphical user interface options 372 may be provided, here, including a field to enter a date or date range 376 and various buttons to select specific time ranges, such as 'past week', 'past month', 'past 3 months', 'past 6 months,' 'past year', 'past 2 years', and the like.

Figure 3E:
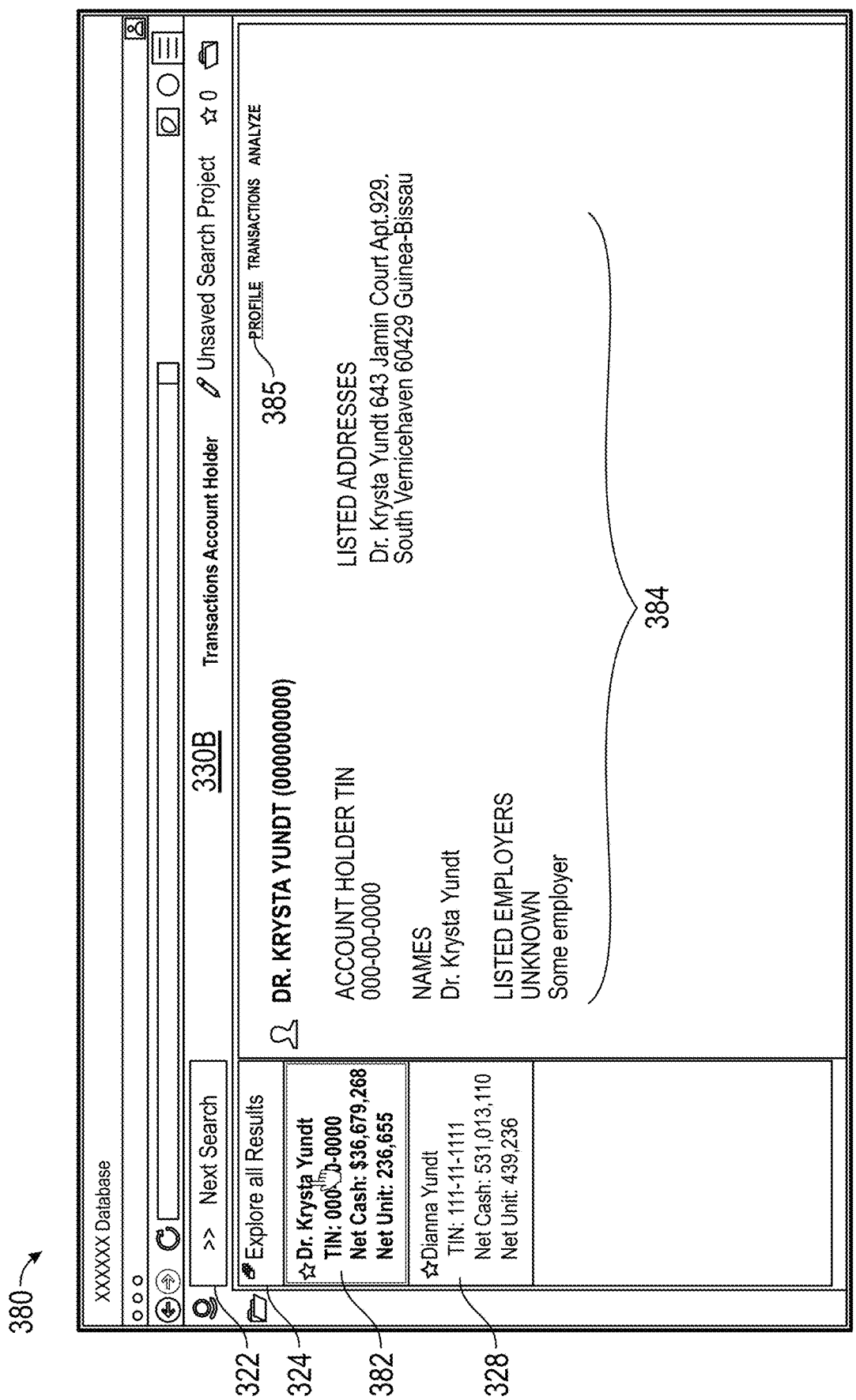

FIG. 3E illustrates a transactions search results user interface 380 showing selection of a single individual from the list of search results as well as associated functionality, according to embodiments herein. As illustrated in FIG. 3E, a single individual 382 is selected from the list of search results, and associated search information 330B is provided in a pane shown, here, on the right side of the user interface 380. The associated functionality may include a profile button 385 to display profile information 384 of the individual selected.

Figure 3F:
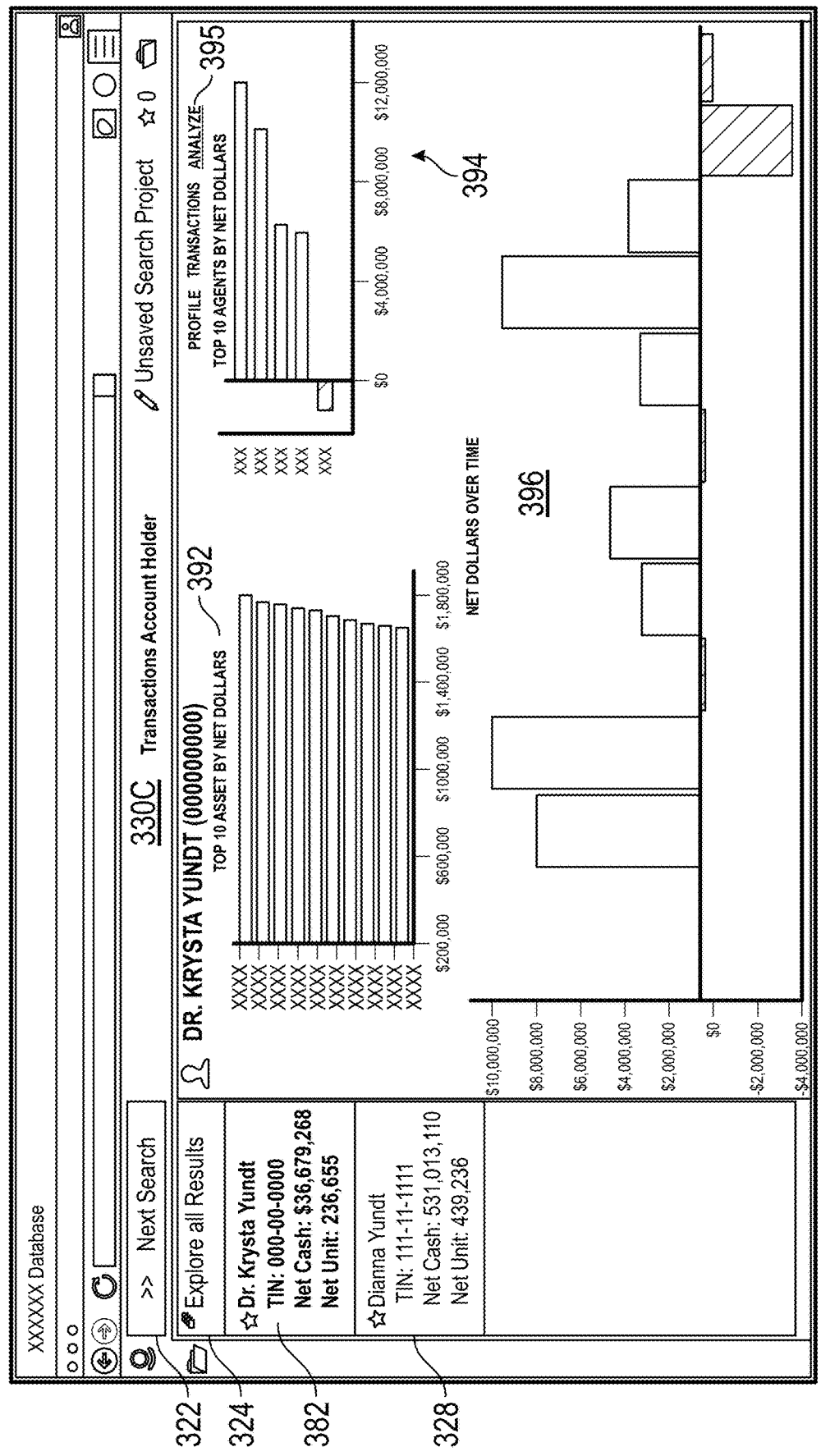

FIG. 3F illustrates another transactions search results user interface 390 showing selection the single individual Krysta Yundt 382 selected from the list of search results as well as additional analysis features and functionality, according to embodiments herein. As with FIG. 3E, the single individual 382 is selected from the list of search results, and associated search information 330C and search analysis functionality is shown as being provided, here, on the right hand side of the screen. As illustrated in FIG. 3F, a user may select an analyze button 395 to perform and/or provide additional analysis on a selection of initial search results (e.g., person 382, transaction data, etc.) returned from the database(s), such as from the tabular transaction data source. The analyze button 392 may provide a variety of aggregations over the transaction data to graphically display unique results that help a user visualize and understand data of significance associated with the selected user. With regard to several illustrative aggregations shown in FIG. 3F, the search information 330C may include a list of transactions or products that were most profitable 392, a list of associated entities that profited the most from that transaction data 394, and a graph showing net profits over time 396. Various other custom aggregations, graphs and views may also be provided, as a function of the parameters of the transaction data in question.

Figure 4A:
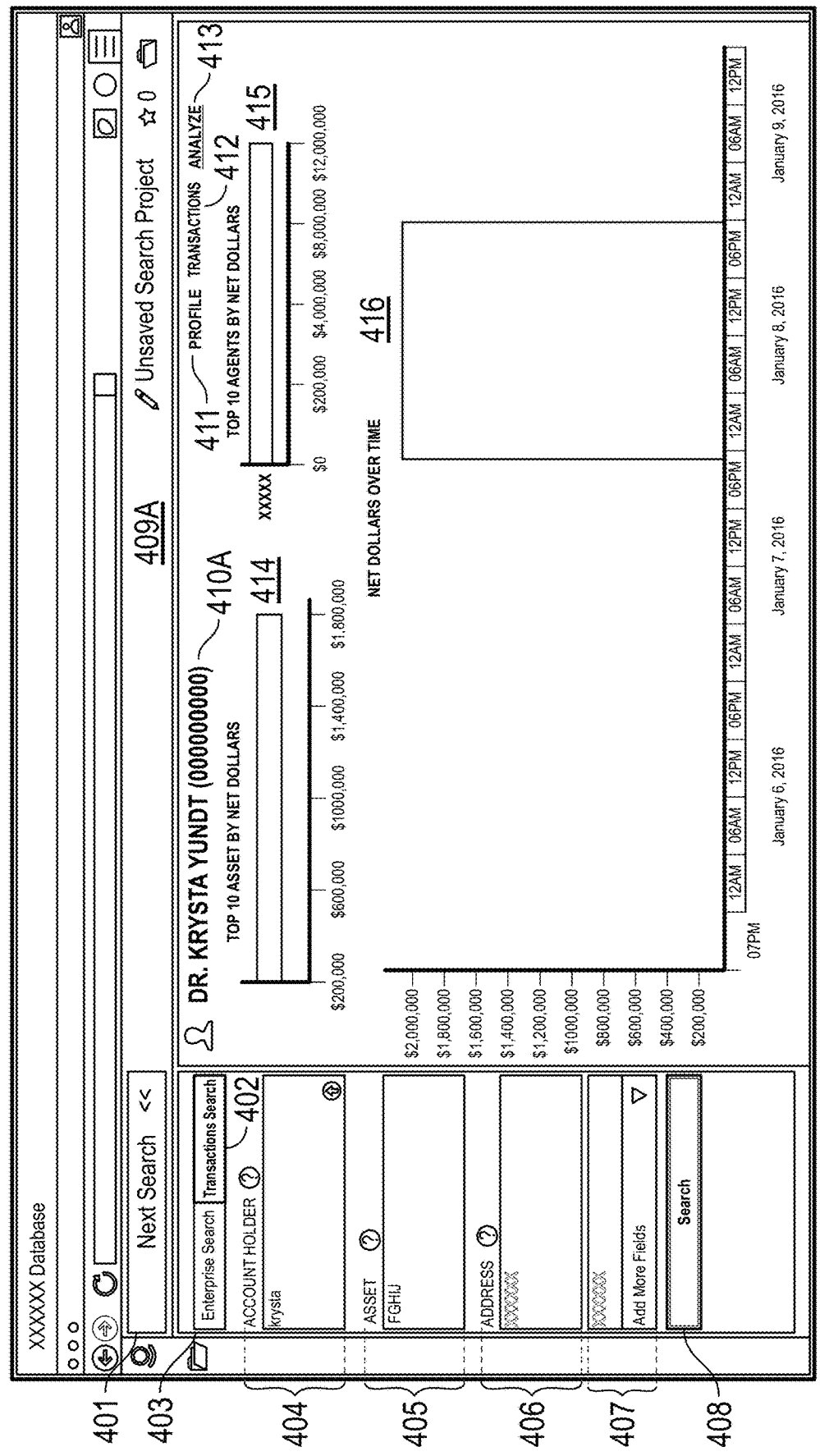
FIGS. 4A-4B illustrate various further aspects of exemplary search and analysis features and associated user interfaces for searching and analyzing resources and related information, according to certain embodiments.
Figure 4B:
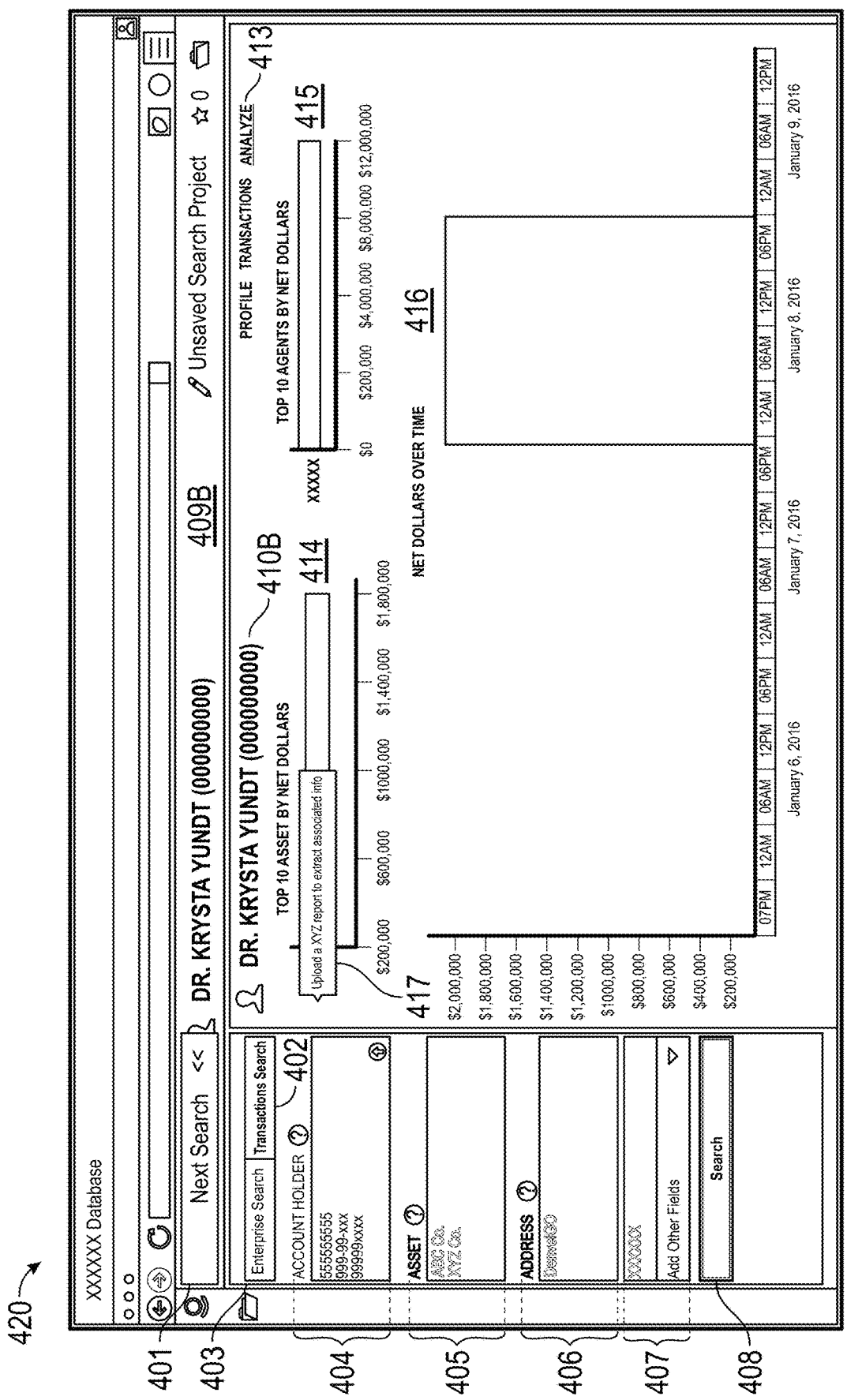

FIGS. 4A-4B illustrate various further aspects involving exemplary search and analysis features and associated user interfaces of a system for searching and analyzing resources and related information, according to certain embodiments.

FIG. 4A illustrates a user interface 400 that displays exemplary transactions search fields 403-408 and an exemplary transaction search results field 409A, according to embodiments herein. As illustrated in FIG. 4A, users have the ability to refine searches as well as select criteria and parameters regarding which additional aggregations and/or analysis of the search results may be provided. The user interface 400 shown in FIG. 4A may include the various transaction search fields and parameters set forth above, namely an account holder field 404, an asset field 405, an address or geographic/location field 406, a drop down menu to add more fields 407, and a select button 408. Turning to the search results field 409A, implementations herein may provide various aggregations and/or analyses of the search results (transaction data) initially supplied. For example, the system may calculate and the user interface may display various graphical indicia helping a user visualize which parties profited the most from the transactions 414, which related entities profited from transactions or were associated with transactions of interest 415, and/or various timing considerations related to the transaction data.

FIG. 4B illustrate another user interface 420 that displays exemplary search and search results fields 403-408, 409B, similar to FIG. 4A, though illustrating the capability of uploading and analyzing reports or documents regarding individuals that contain addition search terms of interest. As illustrated in FIG. 4B, implementations herein may upload and automatically parse and extract additional structured and/or unstructured data regarding a subject individual that may be present in such reports or documents. For example, the account holder field 404 may include a configurable search form that automatically parses and extracts the data from reports or documents uploaded to the system. In some implementations, the automatic parsing and extraction of the data may be achieved via walking the data structure, such as an XML tree, pulling out information having the relevant values or tags, and appending the information into the user interface to perform further analyses on the initial search results. The parsing may be performed right in the browser, with the extracted values being populated directly into the account holder field 404. Here, then, via selection of a button 417 or other UI option, a user may upload a desired (e.g., "XYZ") report and automatically extract additional information regarding individuals and/or transactions of interest. Based on this information, additional exploration and aggregation of the initial search results, e.g. further analysis such as secondary or iterative searches, may be performed as a function of the information automatically parsed and extracted from the desired report.

Figure 5A:
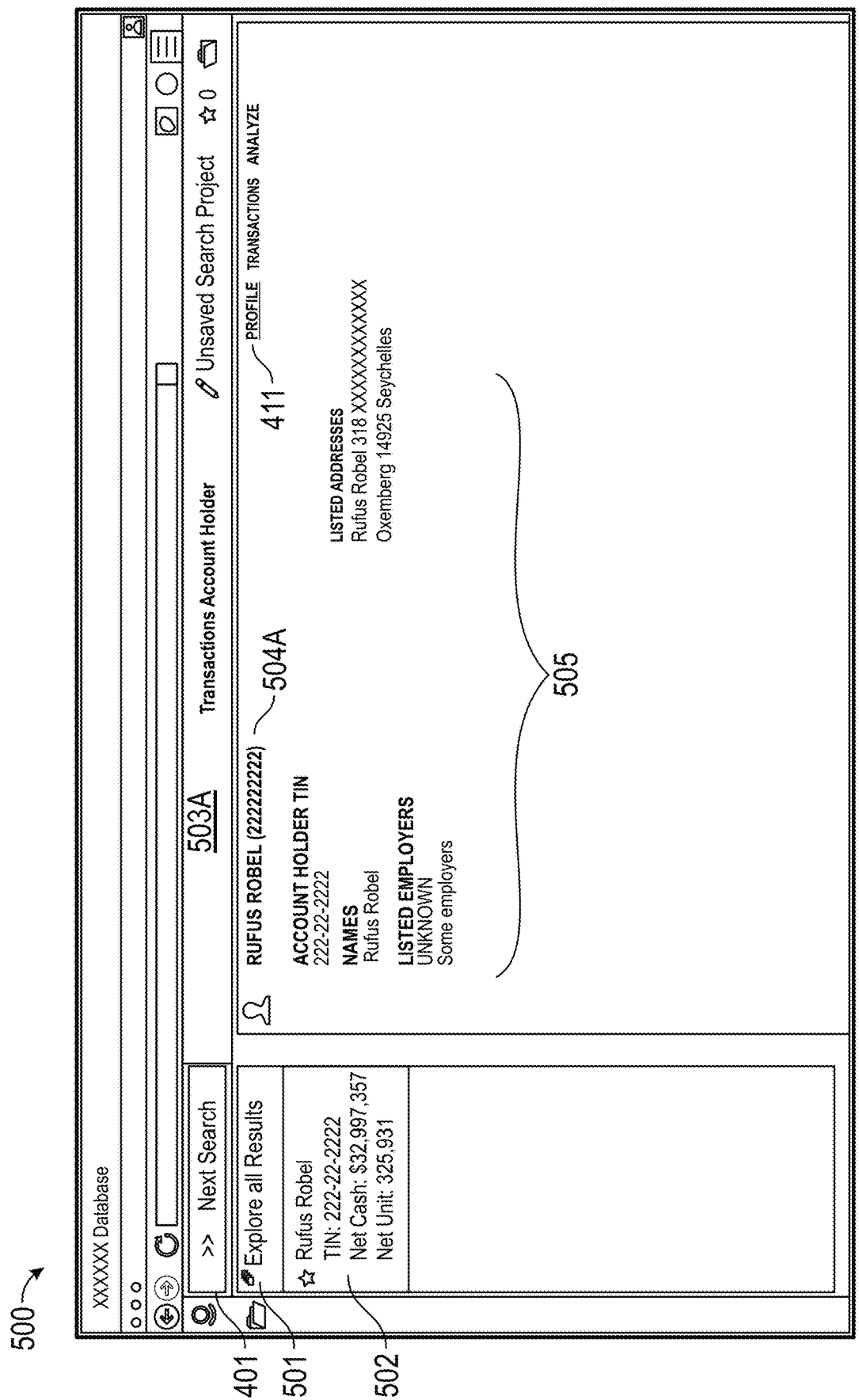
FIGS. 5A-5C illustrate various aspects of exemplary search and explore search results features and associated user interfaces for searching resources and related information, according to certain embodiments.
Figure 5B:
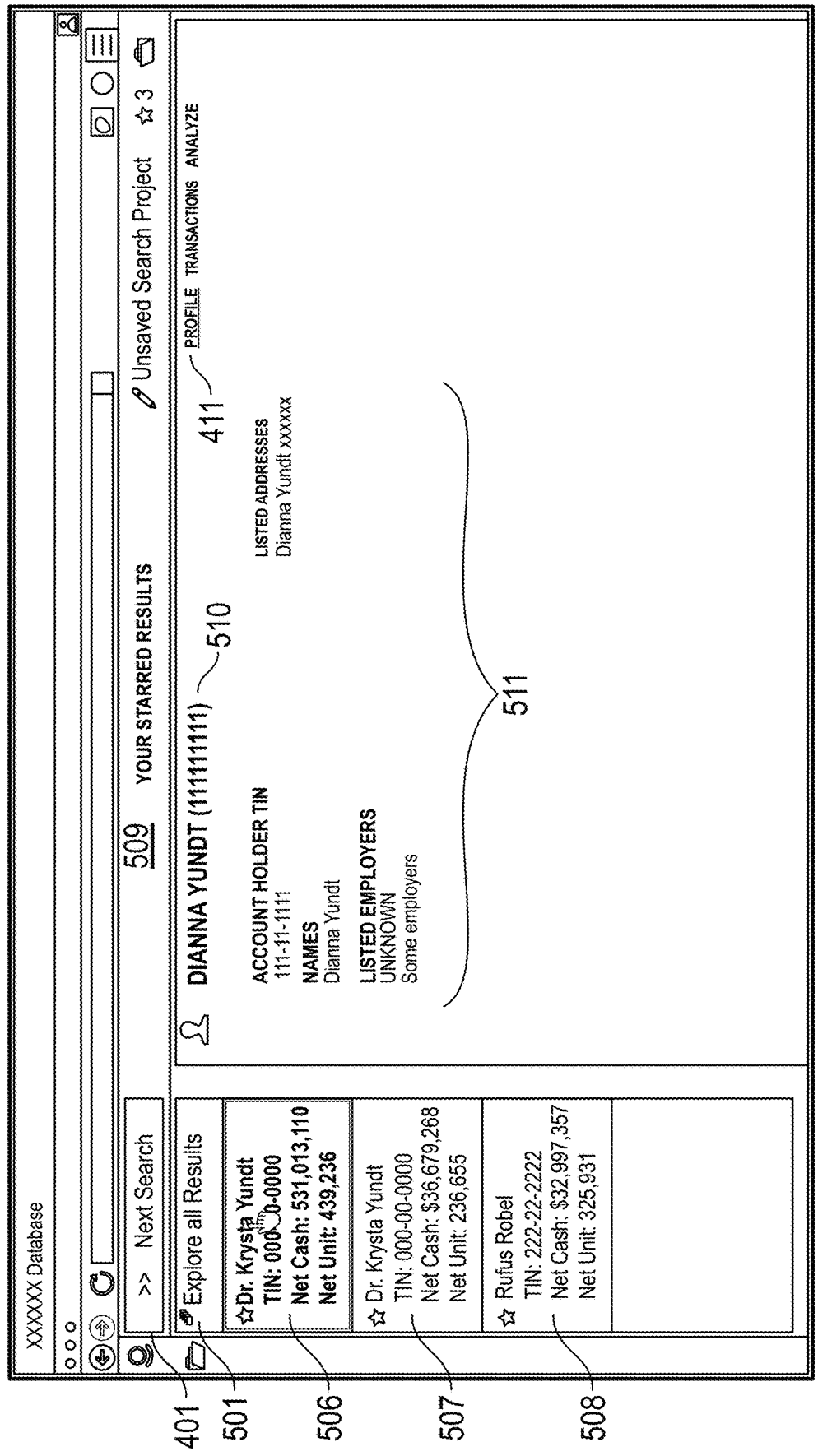
Figure 5C:
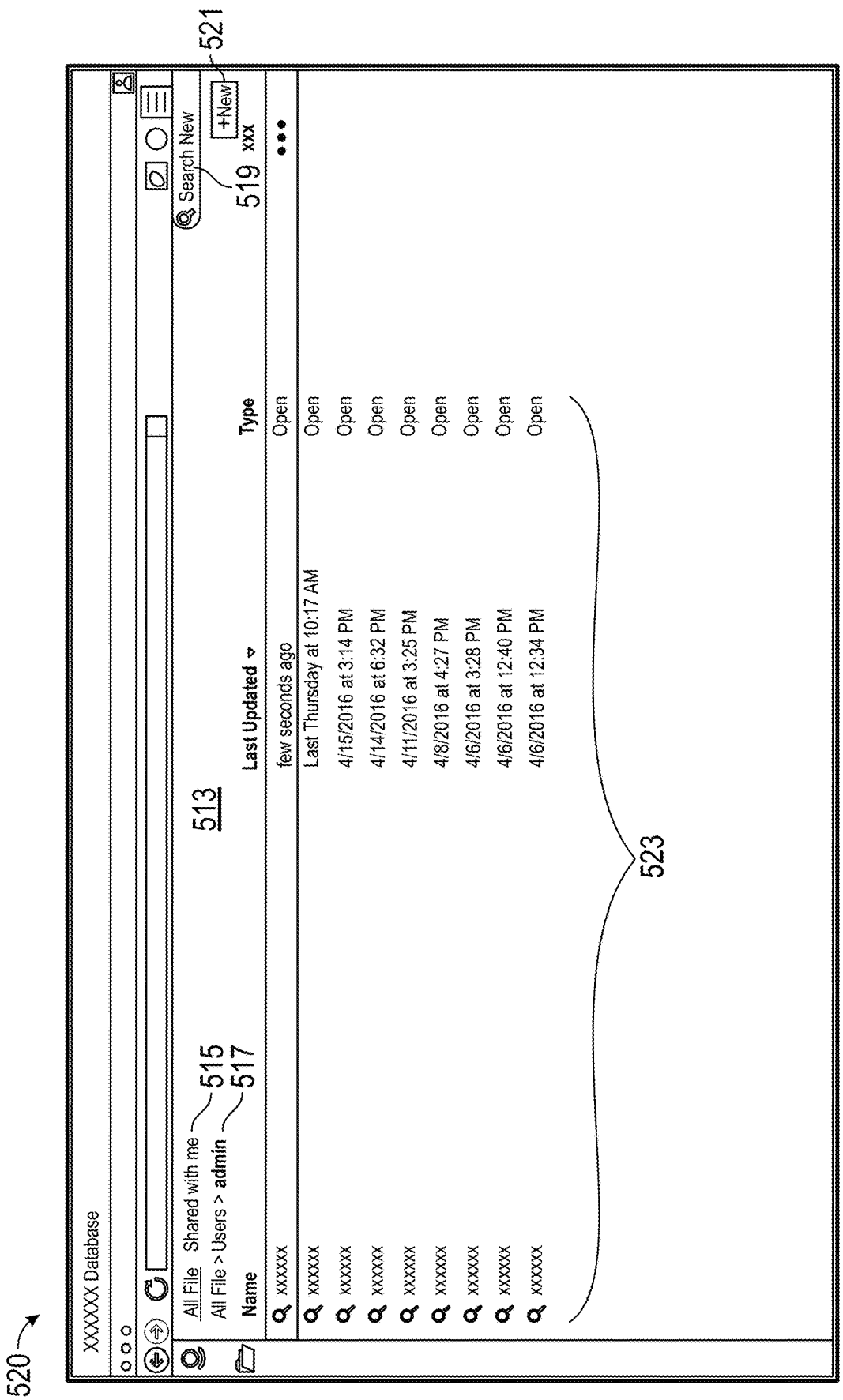

FIGS. 5A-5C illustrate various aspects involving exemplary tagging, saving and exploring results features and associated user interfaces of a search system for searching resources and/or information, according to certain embodiments.

FIG. 5A illustrates a user interface 500 that displays exemplary features of displaying and tagging (or starring) an individual of interest, according to embodiments herein. As illustrated in FIG. 5A, a user interface 500 displaying search results 502 and search information 503A similar to those described above is disclosed. When the profile button 411 is selected, the profile 505 of a selected individual 504A is displayed on the right hand side. As a user performs searches of numerous individuals, for example, the user may tag or star any individual that they would like to later analyze further or aggregate/compare with other individuals or information. In FIG. 5A, for example, the user may tag or star 'Rufus Robel' and add him to a saved person of interest list.

Similarly, the user may perform searches as well as analyze and add a number of additional individuals to the saved persons of interest list. As shown in FIG. 5B, the user may then assemble a list of all the individuals who have been selected as being of interest, with the exemplary user interface 510, here, showing a list of 3 individuals of interest compiled together. Finally, as illustrated in FIG. 5C, the user may then assemble, aggregate, and further analyze the sum of data for all the selected individuals, to analyze or assess whether the compiled or aggregate search results for all of the person of interest shed light on any overlap, shared transaction activities, and/or other transaction commonalities between the group of individuals selected as being of interest.

FIGS. 6A-6F illustrate various aspects involving exemplary enterprise search 403 features and associated user interfaces of a search system for searching resources and related information using data structures.

FIG. 6A illustrates a user interface 600 that displays exemplary search features and search results 605A related to the enterprise search tab 403 as well as underlying functionality, according to embodiments herein. As illustrated in FIG. 6A, when the enterprise search tab 403 is selected, a list of various enterprise search fields 601-604 are shown, here, as being displayed on the left hand side of the user interface, and enterprise search results 605A may be displayed on the right hand side. In some embodiments, the enterprise search fields may include a person name search field 601, an entity name search field 602, a full text search field 604, a list of enterprise data sources that may be selected for searching 604, and a search button. The enterprise search results 605A may include a table of transaction data 606 that satisfies the search criteria.

FIG. 6B illustrates a user interface 608 that displays additional exemplary search results related to the enterprise search functionality set forth in FIG. 6A, according to present embodiments. Here, in the example shown, the user interface 608 may display search results based on information from one or more data sources selected from the enterprise data sources field 604 for an individual selected in the person search field 601. The search results may include records that are modeled or based on the information in the data sources, augmented to provide information that is derived as a function of analysis of the underlying data structures, e.g., object models such as those organized using object nodes and/or object link graphs. FIG. 6B illustrates an exemplary record 609 that may be characterized by a record number 610 and a work identifier 611. Options to view a printable version of the record 615 and/or highlight data that matches in the search 616 may be provided as buttons in some implementations. The selected record 609 may include a variety of additional information based on the object and underlying information. Among other things, for example, the additional information may comprise a record information field 612 containing status and other details of the record, an object/results field 613 that provides information regarding the objects including associated data, and a summary field 614 listing summary information related to the search results provided.

Figure 6C:
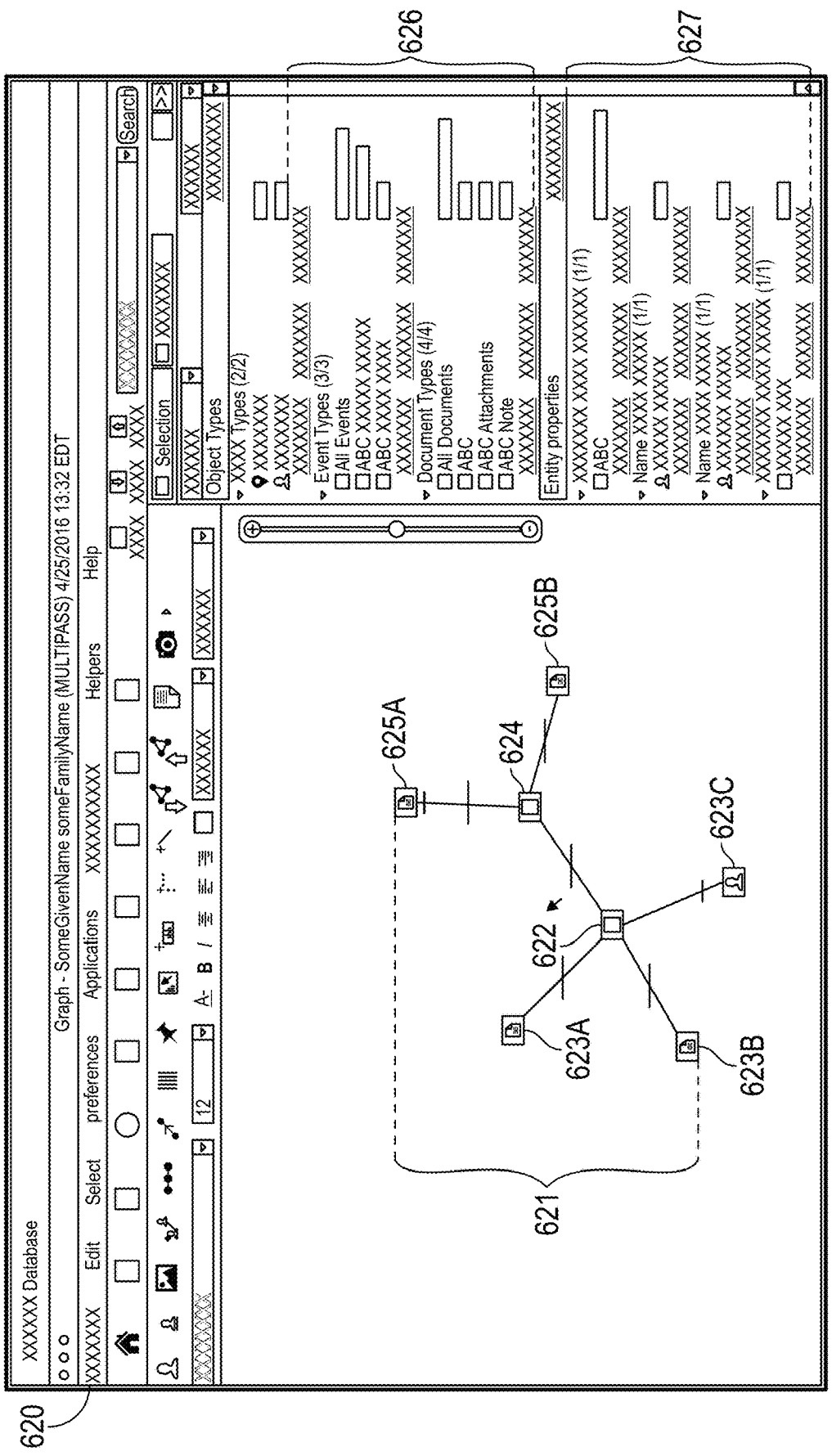

As mentioned above, the search results may include records that are based on the information in the data sources, in that the search results are derived as a function of analysis of object models of the data source information. FIG. 6C illustrates a user interface 620 that displays exemplary graphical depictions of an object model including the underlying objects and data structures, according to one embodiment. As illustrated in FIG. 6C, an exemplary object model 621 may include a root node 622, one or more people 623C associated with the root node, one or more attachments 623A, 623B associated with the root node, one or more notes associated with the root node, and one or more work items 624 associated with the root node. Further, each work item 624 may include a plurality of actions 625A, 625B that parties have added to the work item 624.

According to implementations herein, information from the data sources may be transformed into the object models used to provide the search results, above. In one embodiment, for example, the initial information or source record may be arranged as semi-structured case records. Such records may be parsed and broken-out into the appropriate object model used to provide the search results. Here, for example, an object model may be a graph of a single parent node and a plurality of child nodes. The object models may then be traversed to provide a variety of search results associated with analyzing the full set of nodes within each object model. Here, then, if the basic search initially provides a match of a child node in an object model, the search will traverse the graph of the parent and all of its children. Based on such extended analysis, various UI information and custom views of relevant or potentially relevant information may be provided.

FIG. 6D illustrates a custom view user interface 640 that displays various search results and custom views including those that may be derived from object model analysis, such as that above, according to embodiments herein. As illustrated in FIG. 6D, a list of various search results and custom views that may be similar to and/or associated with those shown in FIG. 6B are shown. These specialized search results and custom views may comprise various information and/or fields. Such fields may comprise a field for 'notes' (e.g., including content such as date, author, note, etc.), a field for workflow history (e.g., including content such as date, author, assignee, assignee group, comment, title, etc.), a field for 'subjects' or individuals (e.g., including content such as name, address, email, phone, etc.), a field containing information regarding the entity or entities associated with transactions (e.g., including content such as name, profession, address, data associated with the entity or entities, etc.), and/or a field related to conduct or information associated with transaction data (e.g., including content or fields for ongoing transactions, dates associated with the transaction, name, type, asset, etc. In one implementation, the 'subjects' field may include a toggle button that displays the names in a manner suitable for copying and pasting. In certain embodiments, these custom view user interfaces may display information from the parent node and all of the children nodes that are returned based on the search criteria provided. Further, an individual performing the search herein and manipulating the user interfaces may navigate between (to and from) the custom views and the associated graphical depictions of the object model data being displayed in the custom view, for example, between views such as FIG. 6C and FIG. 6D, wherein the information being displayed in any such interrelated custom view(s) is dynamically and automatically updated to reflect the latest search criteria and/or adjustments to the search criteria or underlying data made during the search.

Turning back to FIG. 6D, such custom view user interfaces 640 may be similar to FIG. 5B in that it displays search results based on information from another data source selected from the enterprise data sources field 604 for an individual selected from a list of search results 641 on the left hand side of the user interface 640. As illustrated in FIG. 6D, a user interface showing search results from an exemplary "ABC" database for a search subject named "Jane Doe" are provided. Here, for example, the search results in the search results field 642 may include specified information 643 regarding Ms. Doe from the ABC database as well as various other information 644 related to the person or transaction data being searched.

Search results shown in the custom view user interface 640 may be based on various search algorithms for an individual or information selected from a list of search results 641 on the left hand side of the user interface 640. In some embodiments, the custom view information 640 may include search results such as firms, related persons, accounts related to the transaction(s), associated organizations, or other elements of the data structures revealed in response to the search query. The custom view information 640 may be generated based on specialized search algorithms, which may be performed as a function of data properties of the data sources (e.g., document identifiers, record identifiers, transaction numbers, etc.), which provide, as results, information associated with child or root nodes of the object trees. Such information may be provided by a complete mapping, e.g., via full mapping of all data source/unique property combinations, of each data source's unique data properties against the object trees. This provides or yields search capabilities that are able to bring back results related to the roots and/or child nodes thereof. As such, systems and methods may be structured such that the unique properties are configured to link back to the tree roots.

Turning back to search algorithms of the overall object trees, one illustrative algorithm may include performing full text searching across all items that exist in the backend database(s) that have the relevant data source labeled on the object as a property, identifying objects that match the property/search criteria, analyzing those data object via assessing specific properties of the object, performing mapping of various data associated with the search criteria, and returning search results associated with the objects that contain the data being mapped against the objects. Various custom views may then be provided displaying these search results as a function of the information and/or hierarchical structure(s) associated with the underlying objects returned in the search.

In certain embodiments, various search algorithms that may be included or involved in the processing and providing such custom views may utilize specialized search logic, such as logic used for searching elastic search clusters and/or various backend systems. Here, for example, the search logic involved in the enterprise searching may involve special data integrations are defined in such a way to provide and/or utilize unique properties which are utilized to link back to the tree roots. Further, other search integrations may be configured to read through and reduce all the tree roots to get back to a subject parameter, for example, an entity involved with the transaction data. All of these search results and related data may be aggregated into a profile, such as a profile associated with a transaction entity.

Figure 6E:
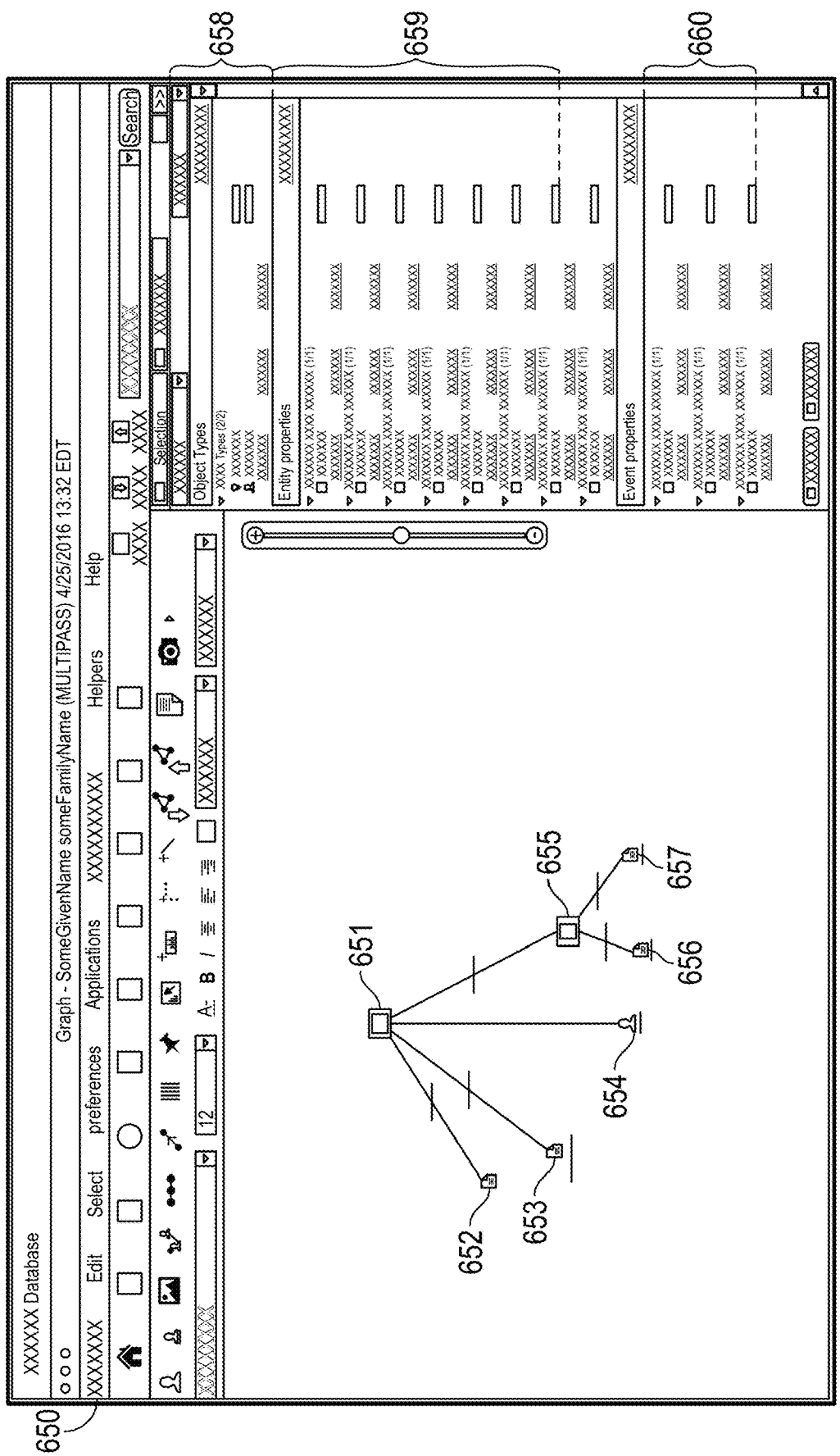

FIG. 6E illustrates a custom view user interface 650 that displays an exemplary object model graph including the objects and underlying object and data structure information as well as search results fields such as for object types 658, entity properties 659 and event properties 660, according to an embodiment. As illustrated in FIG. 6E, an object model displayed in the custom view 650 may be restructured from a previous display (e.g., FIG. 6C) and is configurable into differing object structures to facilitate visualization by a user and provide improved handling or processing of search, analysis and/or other functionality associated with the object model or object model graph. According to implementations herein, the object model and graph may be automatically and/or manually configurable. Here, for example, a parent node 654, e.g., stemming from an initially-identified node 622 of FIG. 6C, may be established and reclassified and relocated graphically as a parent node.

In the implementation shown in FIG. 6E, an object model view related to the search results shown in FIG. 6D may be initially provided as a function of a subject data property that is searched (e.g., a property related to a child node 654 and/or associated property, such as a person, etc.). The initial hit provided based on the search may be displayed as an object 654, such as a person, associated with the parent node 651. One or more attachments 652, 653 associated with the parent node 651 may also then be display on the object model graph as child objects of the parent node 651. Similarly, one or more work items 655 may be identified and displayed as child nodes of the parent node 651, and associated items such as actions 656, 657 may be displayed as children of the work item 655. Further or secondary searching may also then be performed and the results displayed via one or more of the object model graph and/or an associated search results panes, e.g., user interface 630, search results 658, 659, 660, etc.

Figure 6F:
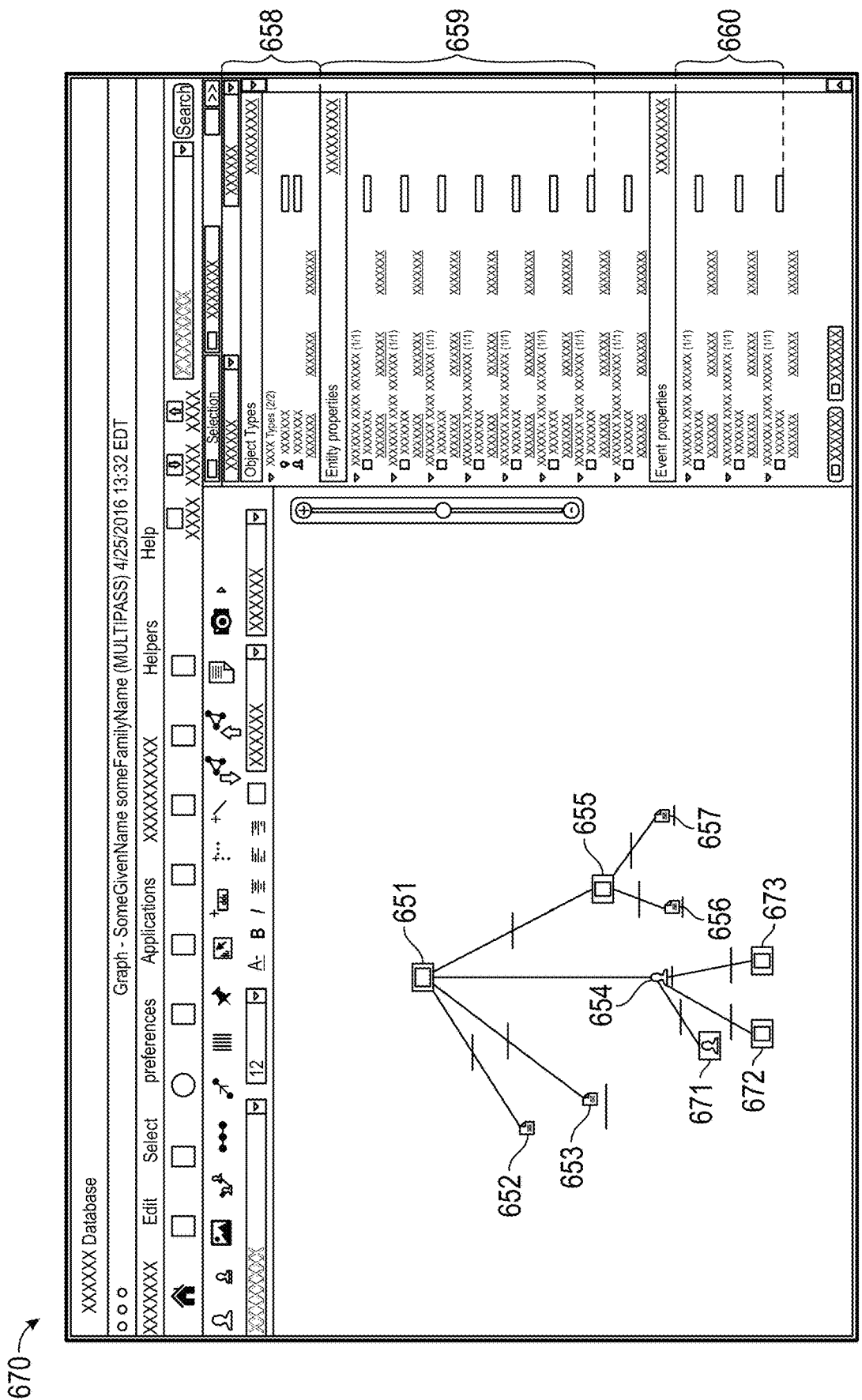

FIG. 6F is another custom view user interface 670 that helps illustrate further searching and graphical features, associated search algorithms, analysis and search results, and an exemplary object model graph including the objects and underlying information and structure of the objects, according to various embodiment herein. As described in connection with FIG. 6F, search algorithms and/or further or secondary searching may be performed to identify particular information and/or objects that bear relation to the initial search criteria and/or results provided. Some search algorithms and logic may involve novel data integrations that are defined in a way that there are unique properties to link back to the tree roots regarding, as explained further below. Other search algorithms and logic may involve novel data integrations that read through all the transaction data/roots and reduce those into associated persons, which may then be shown in a person view that displays all aggregated data associated with that person/profile. Turning to one example, an initial search may provide a hit on a person object 654, and such object may have identifying numbers, parameters or criteria associated with it, which may be listed in the adjacent fields 658, 659, 660. For an initial object identified as being of interest, objects or nodes sharing or having relation to that selection may then be displayed in the graph and may be further searched as a function of secondary searching. According to implementations herein, this secondary searching may be a search of second identifying information associated with an object, such as an identifying number, parameter or criteria selected from the data displayed in the adjacent fields 658, 659, 660. A secondary search performed on such information may then return roots of the graph associated with the second identifying information selected. When such secondary searching is performed, the object(s) returned from the search typically contain the identifier corresponding to the data property of the object being searched by the user.

However, in certain implementations of specific search logic, there may be exceptions when a search may extend beyond exclusively returning objects having the precise identifier or directly corresponding to the unique properties searched. For example, for specific parameters, such as phone numbers (e.g., objects 672, 673), emails (e.g., object 671) and the like, specific secondary searches regarding such parameters may be performed. One specific secondary search, here, may include a first search iteration that yields at least one object (e.g., a person 654) directly linked to such parameter, followed by one or more additional searches to return extended search results, such as information based on a search parameter (e.g., a record or node sharing a same identification number or parameter of the person) and/or additional or associated objects, work items or the like, which may also be related to such records or nodes. In one example, a first search may be done to get back to a person (return that object), then perform another search to return the associated record object 651 and its child nodes, then even further searching to return children of those objects, e.g., work items 656, 657. Such secondary or extended search of objects/nodes may thereby provide a more expansive set of roots to display in the tree. Here, then, such search logic may return results for these specific parameters (e.g., phone numbers, email addresses, etc.), where the secondary search is performed and the search results may include all information related to such parameters, even though the objects may not be contained in or be directly associated with the unique property.

In many implementations, however, basic search functionality herein may be configured in a straightforward manner to primarily involve and return only objects directly having or linked with a unique property, then follow that object back to the root(s). Such root is then displayed in the results list, and the root is then passed to the custom view to gather the full tree for display.

Finally, the various information displayed in the specialized search results and custom views of FIGS. 6A-6F may be selected and used as additional search criteria to augment or refine the initial search results, such as via the secondary search functionality discussed above.

Searching Data Sources, Information and/or Objects

Figure 7:
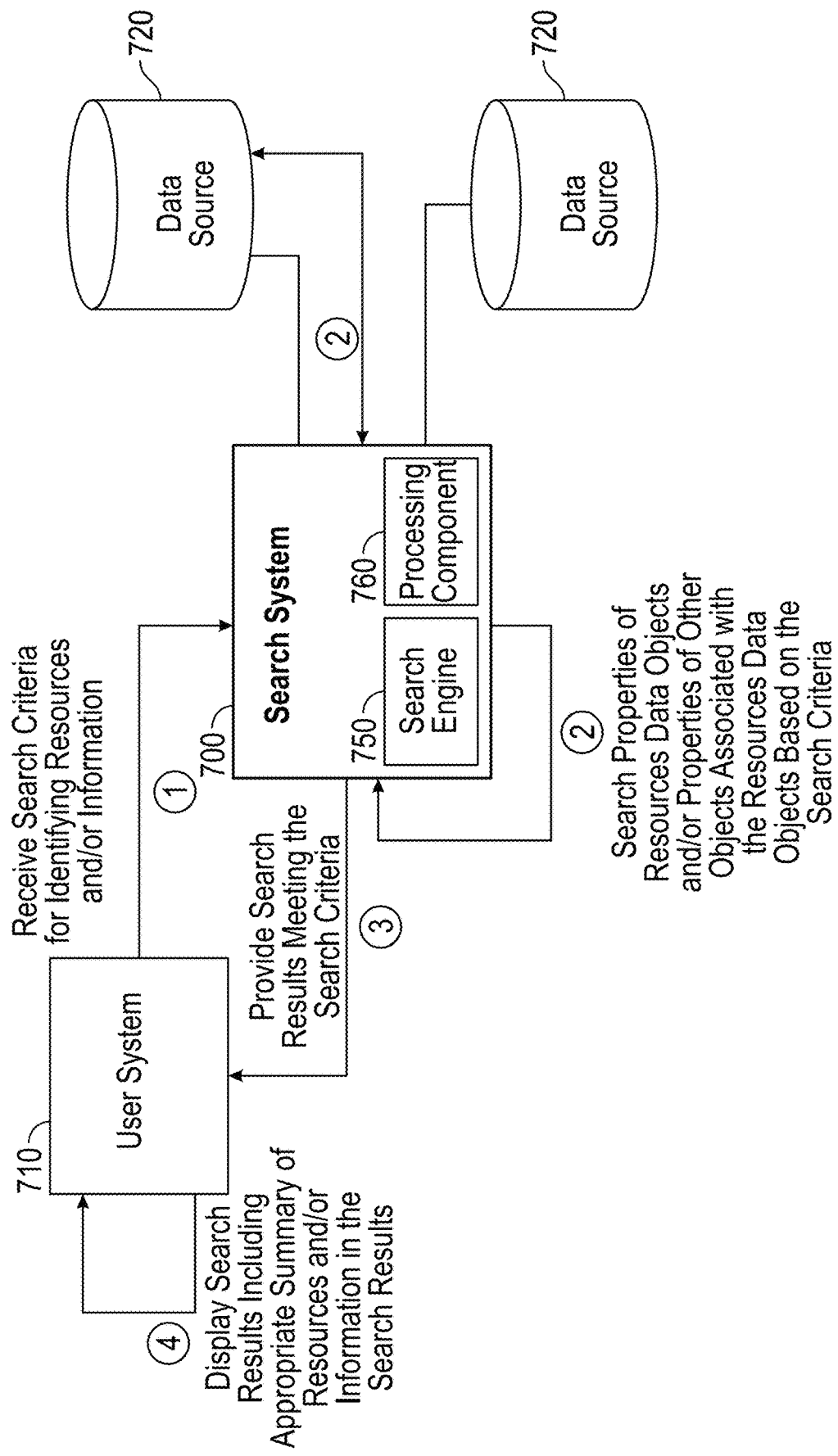
FIG. 7 is a data flow diagram illustrative of the interaction between the various components of a search system configured to search resources and related information, according to one embodiment.

FIG. 7 is a data flow diagram illustrative of the interaction between the various components of a search system 700 configured to search data sources and related information (e.g., documents, information, objects, etc.) using data structures, according to one embodiment. Certain details relating to the system 700 are explained above, e.g., in connection with FIGS. 2-6F. The system 700 may include a search engine 750 and may be connected to one or more data sources 720. The data sources 720 may include one or more databases. The system 700 may communicate with a user system 710. The search system may also include a processing component 760 that handles the storage of data returned from the data sources along with any data generated by the search system. The search engine 750 and/or processing component 760 may reside on a separate computing device from the system 700, depending on the embodiment.

At data flow action 1, the system 700 receives search criteria for identifying desired source data and information (e.g., documents, information, objects, etc.). Users can enter search criteria relating to any or multiple of those data types. As explained above, source data and related information may be represented as respective types of data objects and can be stored in one or more databases or data sources. Certain search criteria may relate to properties of resource data objects, or properties of other data objects linked to the resource data objects. In some embodiments, the search criteria for resources may be based on the properties of data objects that are not resource data objects. When the system 700 receives the search criteria, the system 700 can search through the properties of the resource data objects for the criteria, search through properties of associated data objects, and search through the properties of any other related data objects for relevant properties. The search may be more dynamic since properties of resource data objects, document objects, event data objects, entity data objects, or other associated objects can be used.

At data flow action 2, the system 700 searches properties of resource data objects and/or properties of other objects associated with the resource data objects based on the search criteria. If the user only entered search criteria relating to resources, the system 700 can identify resource data objects that meet the search criteria and return the identified resource data objects as well as document data objects, event data objects, entity data objects, other data objects or information associated with the identified resource data objects. As explained above, search criteria relating to resources may be based on properties of other data objects linked to resource data objects, and the identified resource data objects can include resource data objects whose associated data objects have properties that meet some or all of the search criteria. If the user only entered search criteria relating to a person or transaction, the system 700 may identify data objects that meet the search criteria and return the identified person or transaction data objects as well as resource data objects, event data objects, entity data objects, or other data objects associated with the identified document data objects. Similar to the resource data objects, search criteria relating to documents may also be based on properties of other data objects linked to document data objects, and the identified document data objects can include document data objects whose associated data objects have properties that meet some or all of the search criteria. In a similar fashion, searches centered around event data objects, entity data objects, or other data objects associated with resource data objects can be performed. If the user entered a combination of search criteria relating to resources and search criteria relating to other data objects (for example, transactions, people, documents, or entities), the system 700 can run the search for resource data objects with the search criteria relating to resources and run the search for other data objects with the search criteria relating to such other data objects, and return all resource data objects and such other data objects in the search results, e.g., as explained above.

The search engine 750 may provide various search-related functions, such as searching by faceting, indexing, etc. The data source(s) 720 can store information associated with the data objects. For example, the data sources 720 can include the database system 1110 as explained in connection with FIG. 11.

The data model or data objects may be organized in a particular way in order to optimize searches. For example, a resource data object may include document data objects, and document data objects also are associated with resource data objects. Similarly, a resource data object may include event data objects, and event data objects also are associated with resource data objects. Circular references may be eliminated among data objects in order to provide faster search results.

At data flow action 3, the system 700 provides the search results meeting the search criteria. As mentioned above, the search results can include information such as transactions, people, resources, documents, entities, or other objects. Even in cases where the user only enters search criteria for a person or transaction, the system 700 may return the information or other objects associated with the identified person or transaction.

At data flow action 4, the user system 710 displays the search results including appropriate summary of resources and/or related information (e.g., transactions, people, documents, information and/or other objects) in the search results. The summary can relate to multiple resources or each individual resource, for example, as explained in connection with FIGS. 3A-6F. The user system 710 may generate a tiered user interface in which resources are displayed in one pane or section and details about the resources are displayed in another pane or section. The details can change based on the selected resource(s). As in FIGS. 3A-6F, the resources may be displayed in a first region or pane, and the details about the resources (e.g., information about documents, etc.) can be displayed in a second region or pane the content of the second pane can change or update based on the information in the first pane. Depending on whether one resource is selected or multiple resources are selected in the first pane, the second pane can display information (e.g., summary) about a single resource or display aggregate information (e.g., summary) about multiple resources.

Although various aspects of searching are described using transactions, people, resources, documents, information, and entities, the search system described in this disclosure (e.g., the system 700) can accommodate any type of primary objects and related objects. The search can be focused on a primary object and be based on properties and/or characteristics of the primary object as well as linked objects of the primary object. The search system may accommodate any data organized around an object and its related information. All the user interfaces described above, for example, in connection with FIGS. 3A-6F, may also be adapted and configured for various types of data. For instance, the user interfaces of FIGS. 3A-6F may be adapted for other types of data. The search system can be compatible with any type of search-analyze-export workflow.

Any of the data flow actions performed by the system 700 may be based on user input, may be automated, or may be based on a combination of user input and automation.

Searching for Resources and Related Information Via Graphical UI Features

Figure 8:
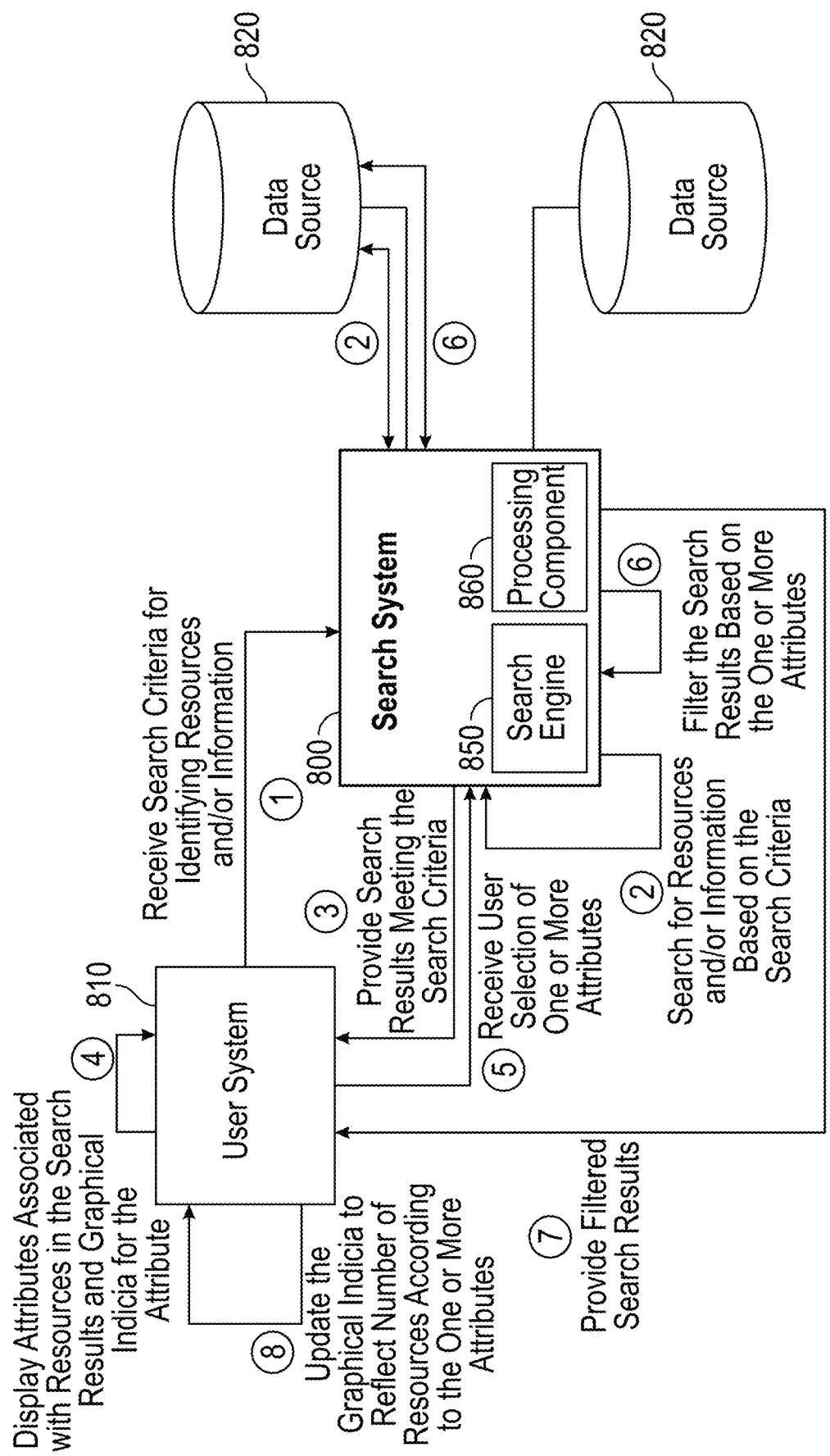
FIG. 8 is a data flow diagram illustrative of the interaction between the various components of a search system configured to search resources and related information using a graphical indicia such as graphical user interface features, according to one embodiment.

FIG. 8 is a data flow diagram illustrative of the interaction between the various components of a search system 800 configured to search resources and/or related information (e.g., people, transactions, documents, information, entities, and/or other objects) via graphical UI features, according to various embodiments. The system 800 and corresponding components of FIG. 8 may be similar to or the same as the system 700 and similarly named components of FIG. 7. The system 800 may include additional or different components, depending on the embodiment. Certain details relating to the system 800 are explained in connection with the above disclosure.

At data flow action 1, the system 800 receives search criteria for identifying people, transactions, resources, documents, information, entities, and/or other objects. Data flow action 1 may be similar to data flow action 1 of FIG. 7. At data flow action 2, the system 800 searches for people, transactions, resources, documents, information, entities, and/or other objects based on the search criteria. At data flow action 3, the system 800 provides the search results meeting the search criteria. Data flow action 3 may be similar to data flow action 3 of FIG. 7.

At data flow action 4, the user system 810 displays information and/or attributes associated with the resources in the search results and graphical UI indicia for the attributes. For example, the user system 810 displays the attributes of the resources and corresponding graphical indicia in the search results panes as explained in connection with FIGS. 3A-6F. The user system 810 may also display attributes of other data objects as appropriate. For instance, if certain search criteria is based on properties of linked data objects of the resource data object, the properties related to the search criteria can also be shown by various written and/or graphical indicia.

At data flow action 5, the system 800 receives user selection of one or more search criteria and/or attributes. At data flow action 6, the system 800 filters the search results based on the one or more criteria and/or attributes. If user selects multiple attributes, the system 400 can recognize that multiple attributes have been selected and compute the changes to the user interface and refresh the user interface once for the selected attributes. Additionally, the system may determine that all remaining search results have a given attribute, and may therefore disallow the user from deselecting that attribute (e.g., by greying out the attribute), thereby preventing the user from filtering down to zero results. The user may also opt-in for certain attributes, e.g., filter for data objects having the certain attributes. Also, the user can opt-out of certain attributes, e.g., filter for data objects not having certain attributes.

At data flow action 7, the system 800 provides filtered search results. At data flow action 8, the user system 810 updates the graphical indicia and/or search results to reflect the number of resources according to the one or more search criteria/attributes.

In some embodiments, the user system 810 may perform data flow actions 5-7, instead of the system 800.

Any of the data flow actions performed by the system 800 may be based on user input, may be automated, or may be based on a combination of user input and automation.

Saving and Sharing Searches for Resources and Related Information

Figure 9:
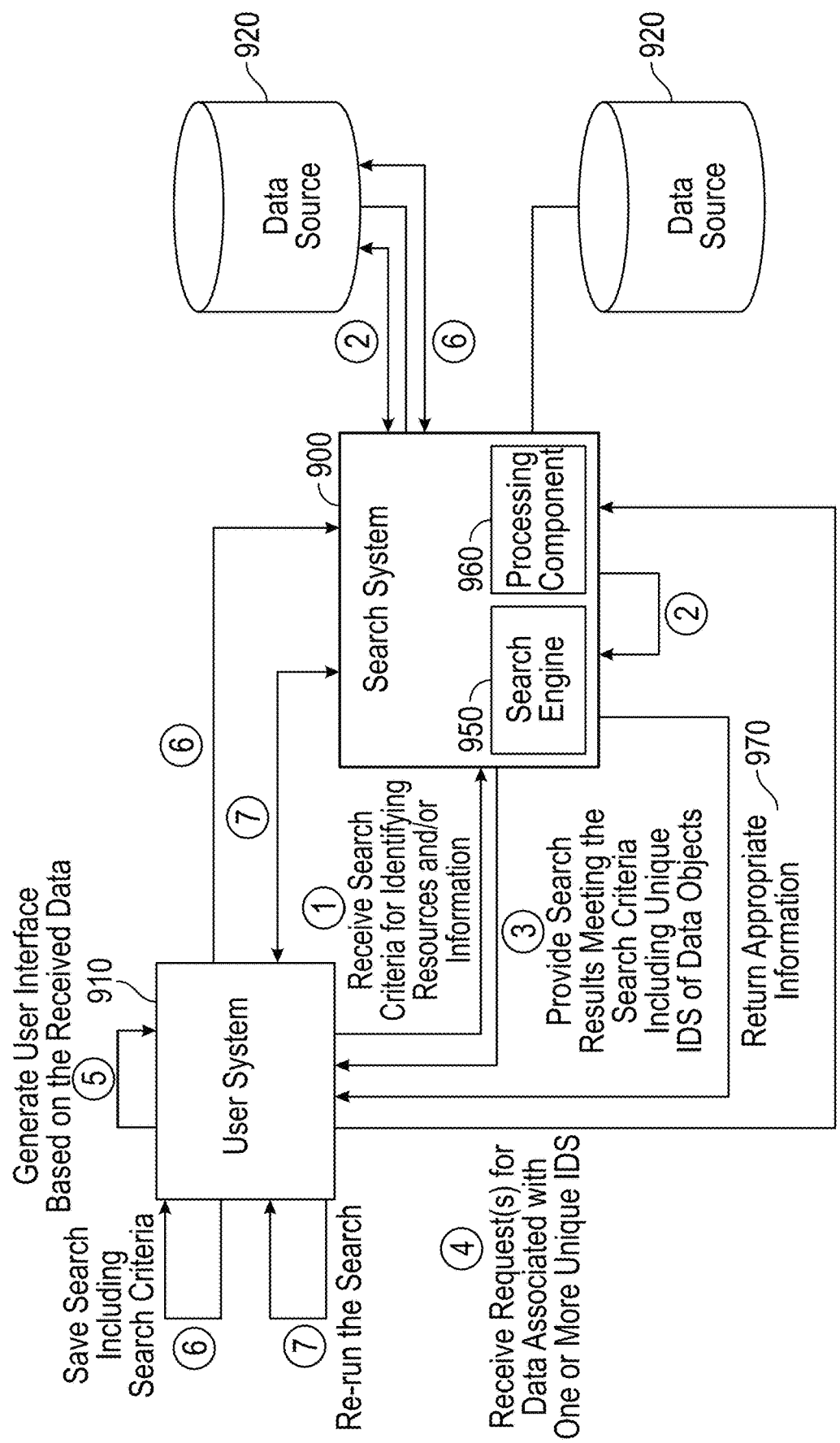
FIG. 9 is a data flow diagram illustrative of the interaction between the various components of a search system configured to search resources and related information using a saved or shared search, according to one embodiment.

FIG. 9 is a data flow diagram illustrative of the interaction between the various components of a search system configured to search resources and related information using a saved or shared search, according to one embodiment. The search system 900 and corresponding components of FIG. 9 may be similar to or the same as the system 700, 800 and similarly named components of FIGS. 7 and 8. The search system 900 may include additional or different components, depending on the embodiment. Certain details relating to the search system 900 are explained above. Some details relating to systems such as 700, 800, and 900 that may be associated with the implementations of FIGS. 3A-9 are explained below, e.g., in connection with FIGS. 11-13.

At data flow action 1, the search system 900 receives search criteria for identifying people, transactions, resources and/or related information (e.g., documents, information, entities, and/or other objects). Data flow action 1 may be similar to data flow action 1 of FIGS. 7 and 8. At data flow action 2, the search system 900 searches properties of resource data objects and/or properties of other objects associated with the resource data objects based on the search criteria. Data flow action 2 may be similar to data flow action 2 of FIG. 7.

At data flow action 3, the search system 900 provides search results meeting the search criteria and may include unique IDs of data objects. The search results can include unique IDs of resource data objects and/or unique IDs of related document, event, entity, or other data objects. The user system 910 may generate a user interface to display the results based on the unique IDs in the search results. In order to reduce the amount of state information stored at the system 900 (e.g., web server), the search system 900 and the user system 910 may send and receive the IDs of the relevant data objects, and corresponding details can be obtained in subsequent requests. In certain embodiments, the initial search results may include information to be displayed in a search window or pane. In some cases, the user system 910 can first receive a list of attributes associated with the IDs in the initial search results and then request the number of data objects having each attribute in subsequent requests. Or the user system 910 may request both the list of attributes associated with the IDs and the number of data objects having each attribute after receiving the initial search results.

At data flow action 4, the system 900 receives request(s) for data associated with one or more unique IDs. If the user system 910 needs details for particular ID(s), the user system 910 can send one or more request(s) to the system 900 for the details. The system 900 can return the appropriate information, at 970, to the user system 910, and the user system 910 can use the details in generating the user interface. In one example, if the user selects a particular resource, the user system 910 requests the details for the selected resource to the system 900, and the system 900 returns the details.

At data flow action 5, the user system 910 generates a user interface based on the received data. As explained above, the user system 910 can compute and generate the user interface on the fly based on the search results. The user may filter the initial search results by selecting or excluding attributes from user interface search functionality. For instance, the user system 910 may only receive identifiers (IDs) associated with the data objects and generate the user interface on the fly based on the IDs. The user system 910 may request further information used for generating the user interface (e.g., details for particular IDs) from the search system 900 as needed. The user system 910 can request the system 900 for updated search results. The user system 910 can also request the system 900 for the updated count for the attributes in order to compute the search results, including graphical indicia. When any changes or updates occur within the user interface that triggers an update to the search, the user system 910 or the system 900 can determine what other data within the user interface should be updated. In certain embodiments, the user system 910 or the system 900 determines the dependencies between different parts of an application and figures out the order of changes as well as the minimum amount of changes that should be made to update (e.g., avoid repeating same or similar operations, etc.).

Using the IDs of data objects in the search results can reduce the amount of data that is stored on the system 900 for a particular search. For example, the web server can only store the IDs and obtain further information from the data sources 920 as needed. For example, in response to an initial search the search system 900 may obtain results as a list of matching object IDs. Then the matching object IDs may be used by the search system to obtain information needed to render information such as graphical indicia, keywords tab, etc. This information may then be provided to the user system 910 for rendering. When the user provides an input, e.g., clicking a graphical indicia checkbox, the search system 900 may then filter to the subset of object IDs still matching from the original search, and recompute all the UI elements (e.g., GUI indicia, etc.). In this manner, the system 900 can provide scalability since the web server does not need to store a lot of information for a search, and in certain implementations may maintain an initial list of matching object ids configured to be further filtered very efficiently, and may thereby be able to handle a large number of concurrent search requests without crashing.

At data flow action 6, the user system 910 saves the search including the search criteria. For example, a link to the search is created on the Desktop of the user's computer. The user may also share the search, for example, by email or through a link. When the user saves or shares the search, the system 900 may create a unique ID for the search, create a permanent link (e.g., permalink) to access the search, and save relevant information (e.g., state information) in the data sources 920. The system 900 may also save information specific to the user, such as the starred resources. When the search is accessed at a later time by the user or another user, the system 900 can return results that meet the search criteria at that time. Therefore, the users can view the up-to-date search results for the same search criteria. In some embodiments, the user may not make changes to a shared search, but may create or share a new search based on the shared search. The system 900 can create a new unique ID for the new search and save the information in the data sources 920. The new search may also be shared. Users may make changes to their own saved searches.

At data flow action 7, the user system 910 reruns the search. When the user accesses the link to the saved or shared search, the user system 910 requests the search to the system 900, and the system 900 can provide the up-to-date results for the search, as explained above.

Any of the data flow actions performed by the system 900 may be based on user input, may be automated, or may be based on a combination of user input and automation.

Figure 10:
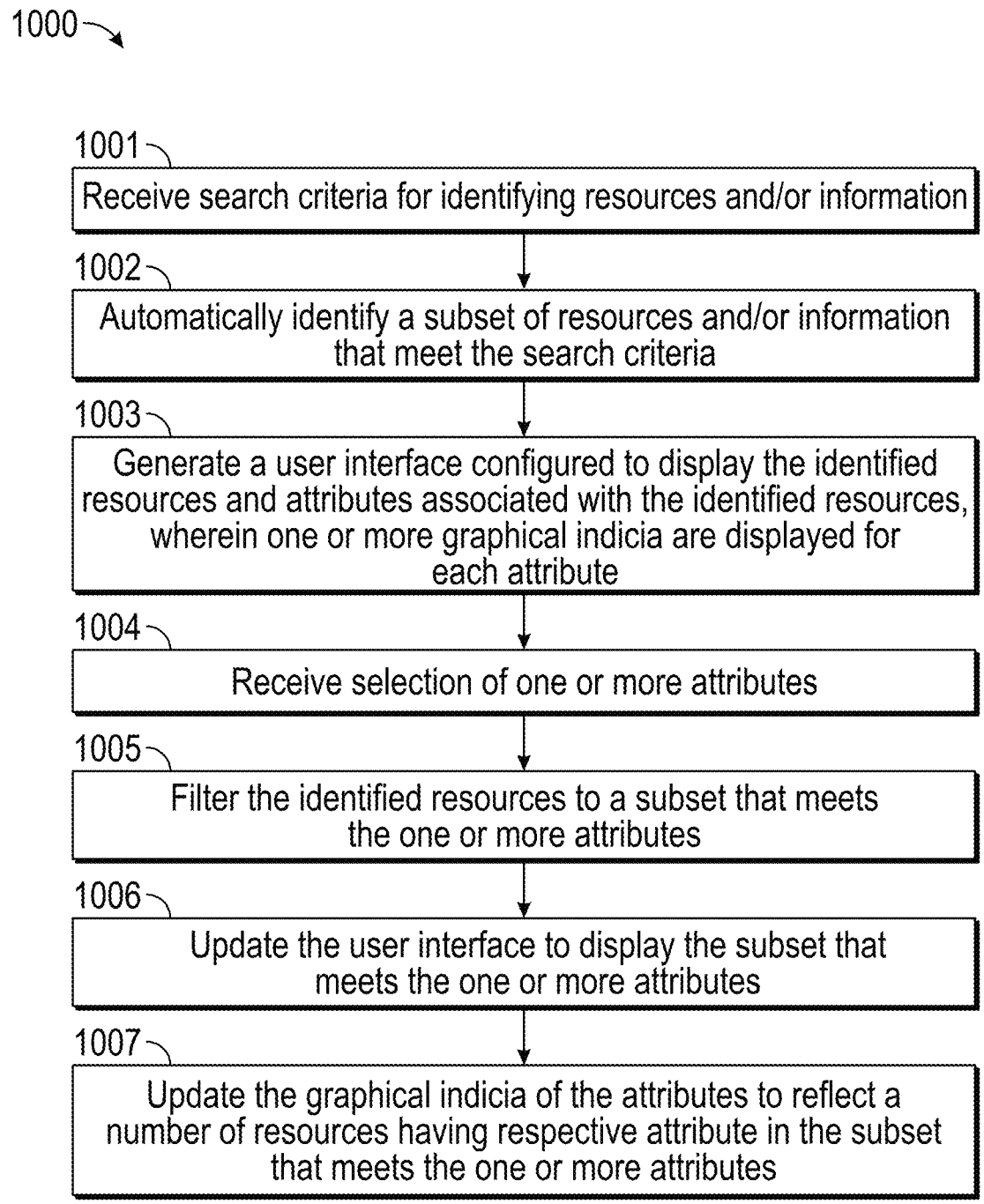
FIG. 10 illustrates a flowchart for searching and/or analyzing resources and information, according to certain embodiments.

FIG. 10 illustrates a flowchart for searching resources and/or related information (e.g., people, transactions, documents, information, entities, and/or other objects) using data structures, according to certain embodiments. The process 1000 may be implemented by one or more systems described with respect to FIGS. 7-9. For illustrative purposes, the process 1000 is explained below in connection with the system 700 in FIG. 7. Certain details relating to the process 1000 are also explained in more detail elsewhere herein. Depending on the embodiment, the process 1000 may include fewer or additional blocks, and the blocks may be performed in an order that is different than illustrated.

At block 1001, the system 1000 receives search criteria for identifying data associated with transactions and/or related information (e.g., people, transaction data, documents, information, entities and/or other objects). The search criteria may relate to the people, transaction data, resources, documents, information, entities, or other objects. For example, the search criteria may include one or more of the search criteria, parameters and/or selections set forth above in connection with FIGS. 3A-6F. Some of the search criteria relating to the resources may be based on the properties of other data objects associated with the resources. The information, transaction data, resources, documents, entities, and other objects may be represented as respective data objects. Such elements may also be associated with each other.

At block 1002, the system 700 automatically identifies subsets of the resources and/or related information (e.g., transaction data, people, documents, information, entities, and/or other objects) that meet the search criteria. The identified resources may meet the search criteria or may be associated with the identified documents, events, entities, or other objects that meet the search criteria. The identification of the subsets of the search results can be based on one or more of: properties of the transactions, properties of the resources, properties of the documents, properties of the information, properties of the entities, or properties of other data objects associated with the resources. Similar to the identified resources, such elements can meet the search criteria or can be associated with the identified resources that meet the search criteria.

At block 1003, the system 700 may generate a user interface configured to display the search results and/or identified resources and attributes associated with the search results and/or identified resources. The attributes can correspond to some or all of the properties of the identified resources. In some embodiments, at least some of the attributes can correspond to the properties of the other data objects associated with the resources. The user interface can display an aggregate summary relating to the identified transaction data, resources and documents, information, entities, and other objects associated with the identified resources. Graphical indicia, such as interactive graphical indicia, may be displayed in the user interface for each attribute. The graphical indicia can reflect the number of the identified resources having the attribute.

In certain embodiments, the user interface includes a first pane for displaying the identified resources or parameters and a second pane for displaying information associated with one or more selected items of the identified resources or parameters. If one or more resources of the identified resources or parameters are selected in the first pane, one or more of transaction data, documents, information, entities, or other objects associated with the one or more selected resources may be displayed in the second pane. For example, the one or more of transaction data, documents, information, entities, or other objects displayed in the second pane can meet the search criteria.

At block 1004, the system 700 receives selection of one or more attributes. At block 1005, the system 700 filters the identified resources to a subset that meets the one or more attributes.

At block 1006, the system 700 updates the user interface to display the subset that meets the one or more attributes. For example, updating the user interface may include updating the graphical indicia of the attributes to reflect the number of resources having respective attribute in the subset that meets the one or more attributes. In some embodiments, the system 700 receives exclusion of second one or more attributes, or an indication of the exclusion. The system 700 filters the identified resources to a second subset that does not meet the second one or more attributes. The system 700 updates the user interface to display the second subset. The system 700 also updates the graphical indicia of the attributes to reflect the number of resources having respective attribute in the second subset.

In certain embodiments, the user system 710 performs all or some of blocks 1001-1007, instead of the system 700. For example, as described in connection with FIGS. 8-9, the user system 710 generates the user interface, filters the identified resources to the subset that meets the one or more attributes, updates the user interface, updates the graphical indicia of the attributes, etc.

Object Centric Data Model

To provide a framework for the discussion of specific systems and methods described herein, an example database system 1110 using an ontology 1105 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 1105. The conceptual data model is independent of any particular database used for durably storing one or more database(s) 1109 based on the ontology 1105. For example, each object of the conceptual data model may correspond to one or more rows in a relational database or an entry in Lightweight Directory Access Protocol (LDAP) database, or any combination of one or more databases.

Figure 11:
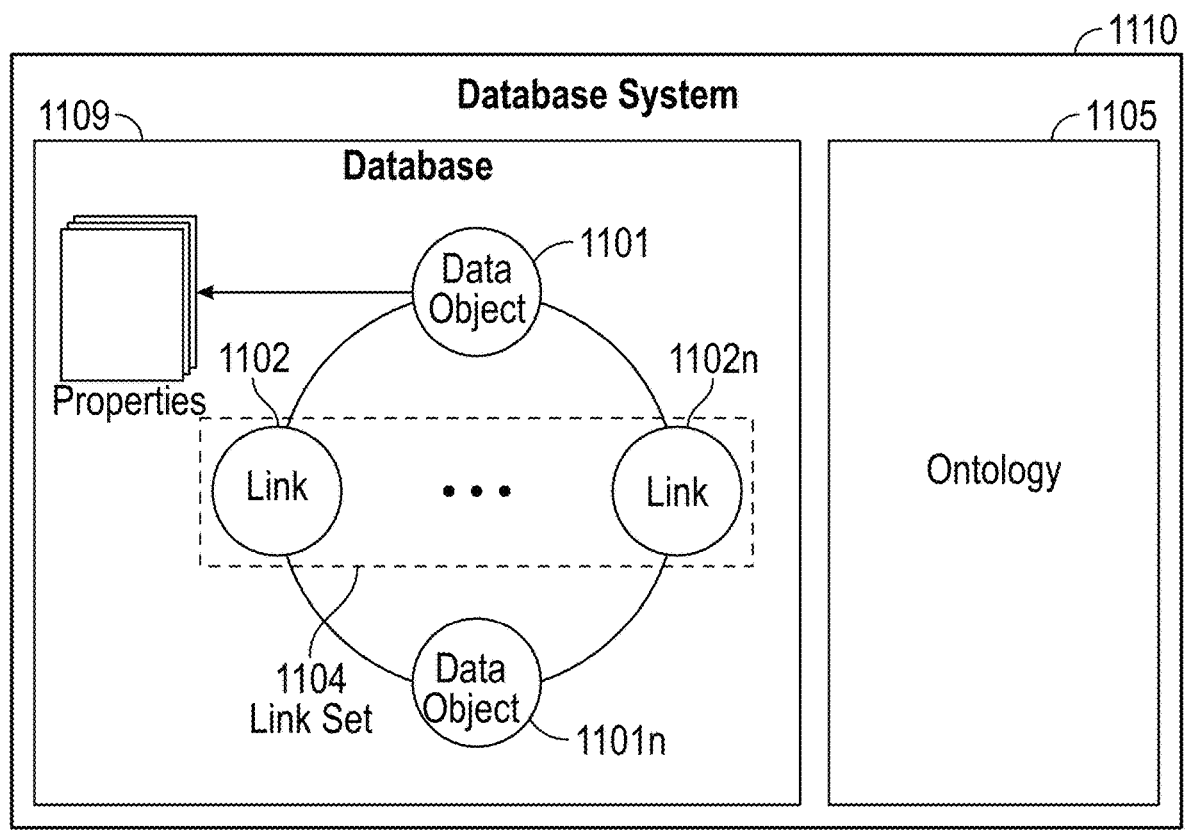
FIG. 11 illustrates one embodiment of a database system using an ontology consistent with implementations herein.

FIG. 11 illustrates an object-centric conceptual data model according to an embodiment. An ontology 1105, as noted above, may include stored information providing a data model for storage of data in the database 1109. The ontology 1105 may be defined by one or more object types, which may each be associated with one or more property types. At the highest level of abstraction, data object 1101 is a container for information representing things in the world. For example, data object 1101 can represent an entity such as a person, a place, an organization, a market instrument, or other noun. Data object 1101 can represent an event that happens at a point in time or for a duration. Data object 1101 can represent a document or other unstructured data source such as transaction data, information regarding people, entities and/or events, documents, or the like. Each data object 1101 is associated with a unique identifier that uniquely identifies the data object within the database system.

Different types of data objects may have different property types. For example, a "Person" data object might have an "Eye Color" property type and an "Event" data object might have a "Date" property type. Each property 1103 as represented by data in the database system 1110 may have a property type defined by the ontology 1105 used by the database 1105.

Objects may be instantiated in the database 1109 in accordance with the corresponding object definition for the particular object in the ontology 1105. For example, a specific monetary payment (e.g., an object of type "event") of US$30.00 (e.g., a property of type "currency") taking place on Mar. 27, 2016 (e.g., a property of type "date") may be stored in the database 1109 as an event object with associated currency and date properties as defined within the ontology 1105.

The data objects defined in the ontology 1105 may support property multiplicity. In particular, a data object 1101 may be allowed to have more than one property 1103 of the same property type. For example, a "Person" data object might have multiple "Address" properties or multiple "Name" properties.

Each link 1102 represents a connection between two data objects 1101. In one embodiment, the connection may be through a relationship, an event, or through matching properties. Further, a relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Transaction" data object representing a particular transaction if they both participated in that transaction. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 1101 can have multiple links with another data object 1101 to form a link set 1104. For example, two "Person" data objects representing a husband and a wife could be linked through a "Spouse Of" relationship, a matching "Address" property, and one or more matching "Event" properties (e.g., a wedding). Each link 1102 as represented by data in a database may have a link type defined by the database ontology used by the database.

Figure 12:
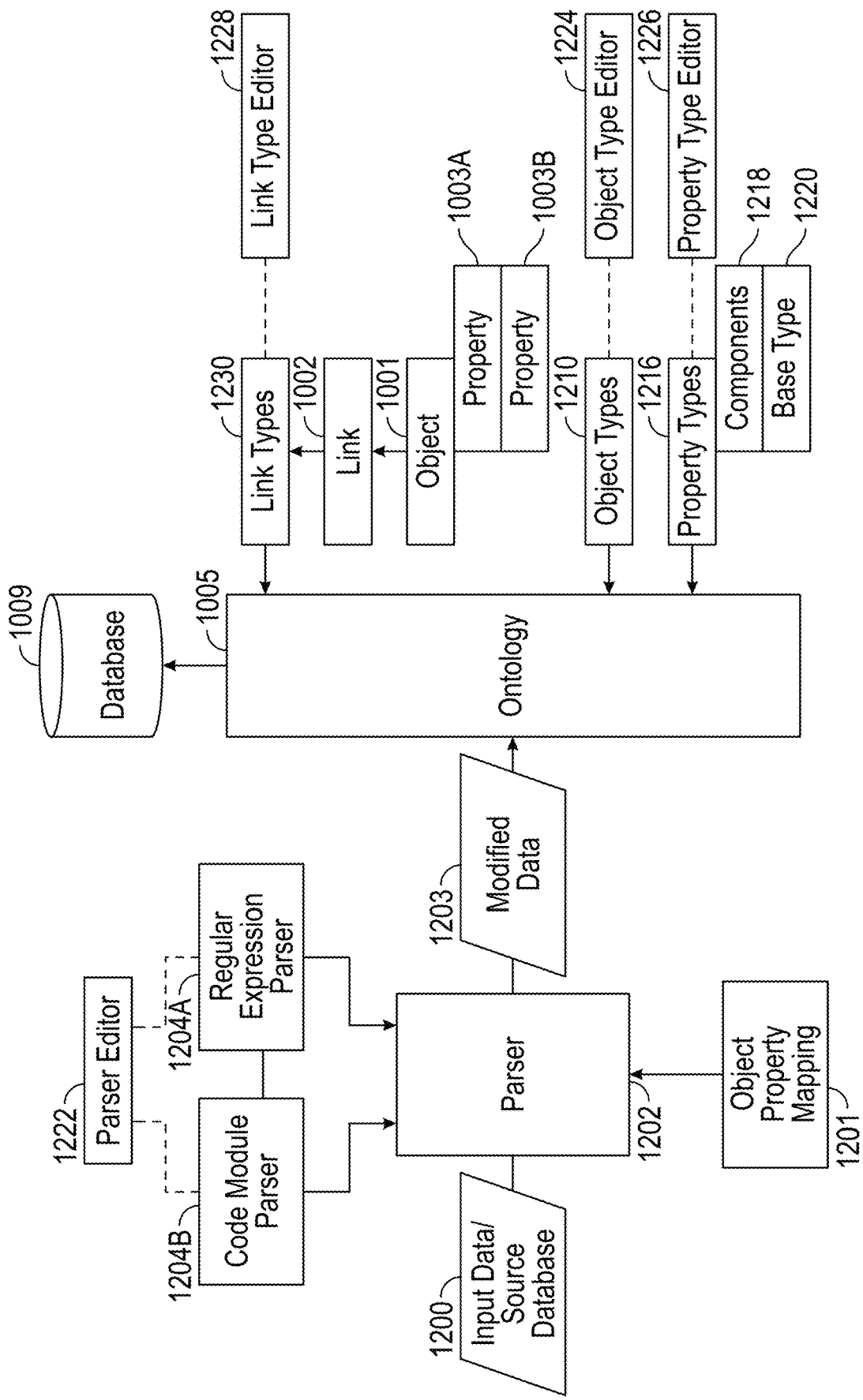
FIG. 12 illustrates one embodiment of a system for creating data in a data store using a dynamic ontology consistent with implementations herein.

FIG. 12 is a block diagram illustrating exemplary components and data that may be used in identifying and storing data according to an ontology. In this example, the ontology may be configured, and data in the data model populated, by a system of parsers and ontology configuration tools. In the embodiment of FIG. 12, input data 1200 is provided to parser 1202. The input data may comprise data from one or more sources. For example, an institution may have one or more databases with information on transactions data, people, and other information. The databases may contain a variety of related information and attributes about each type of data, such as a "date" for a transaction, an address for a person, and an amount of money or currency that changed hands. The parser 1202 is able to read a variety of source input data types and determine which type of data it is reading.

In accordance with the discussion above, the example ontology 1205 comprises stored information providing the data model of data stored in database 1209, and the ontology is defined by one or more object types 1210, one or more property types 1216, and one or more link types 1230. Based on information determined by the parser 1202 or other mapping of source input information to object type, one or more data objects 1201 may be instantiated in the database 1209 based on respective determined object types 1210, and each of the objects 1201 has one or more properties 1203 that are instantiated based on property types 1216. Two data objects 1201 may be connected by one or more links 1202 that may be instantiated based on link types 1230. The property types 1216 each may comprise one or more data types 1218, such as a string, number, etc. Property types 1216 may be instantiated based on a base property type 1220. For example, a base property type 1220 may be "Locations" and a property type 1216 may be "Home."

In an embodiment, a user of the system uses an object type editor 1224 to create and/or modify the object types 1210 and define attributes of the object types. In an embodiment, a user of the system uses a property type editor 1226 to create and/or modify the property types 1216 and define attributes of the property types. In an embodiment, a user of the system uses link type editor 1228 to create the link types 1230. Alternatively, other programs, processes, or programmatic controls may be used to create link types and property types and define attributes, and using editors is not required.

In an embodiment, creating a property type 1216 using the property type editor 1226 involves defining at least one parser definition using a parser editor 1222. A parser definition comprises metadata that informs parser 1202 how to parse input data 1200 to determine whether values in the input data can be assigned to the property type 1216 that is associated with the parser definition. In an embodiment, each parser definition may comprise a regular expression parser 1204A or a code module parser 1204B. In other embodiments, other kinds of parser definitions may be provided using scripts or other programmatic elements. Once defined, both a regular expression parser 1204A and a code module parser 1204B can provide input to parser 1202 to control parsing of input data 1200.

Using the data types defined in the ontology, input data 1200 may be parsed by the parser 1202 determine which object type 1210 should receive data from a record created from the input data, and which property types 1216 should be assigned to data from individual field values in the input data. Based on the object-property mapping 1201, the parser 1202 selects one of the parser definitions that is associated with a property type in the input data. The parser parses an input data field using the selected parser definition, resulting in creating new or modified data 1203. The new or modified data 1203 is added to the database 1209 according to ontology 1205 by storing values of the new or modified data in a property of the specified property type. As a result, input data 1200 having varying format or syntax can be created in database 1209. The ontology 1205 may be modified at any time using object type editor 1224, property type editor 1226, and link type editor 1228, or under program control without human use of an editor. Parser editor 1222 enables creating multiple parser definitions that can successfully parse input data 1200 having varying format or syntax and determine which property types should be used to transform input data 1200 into new or modified input data 1203.

Implementation Mechanisms

According to one embodiment, the techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 13:
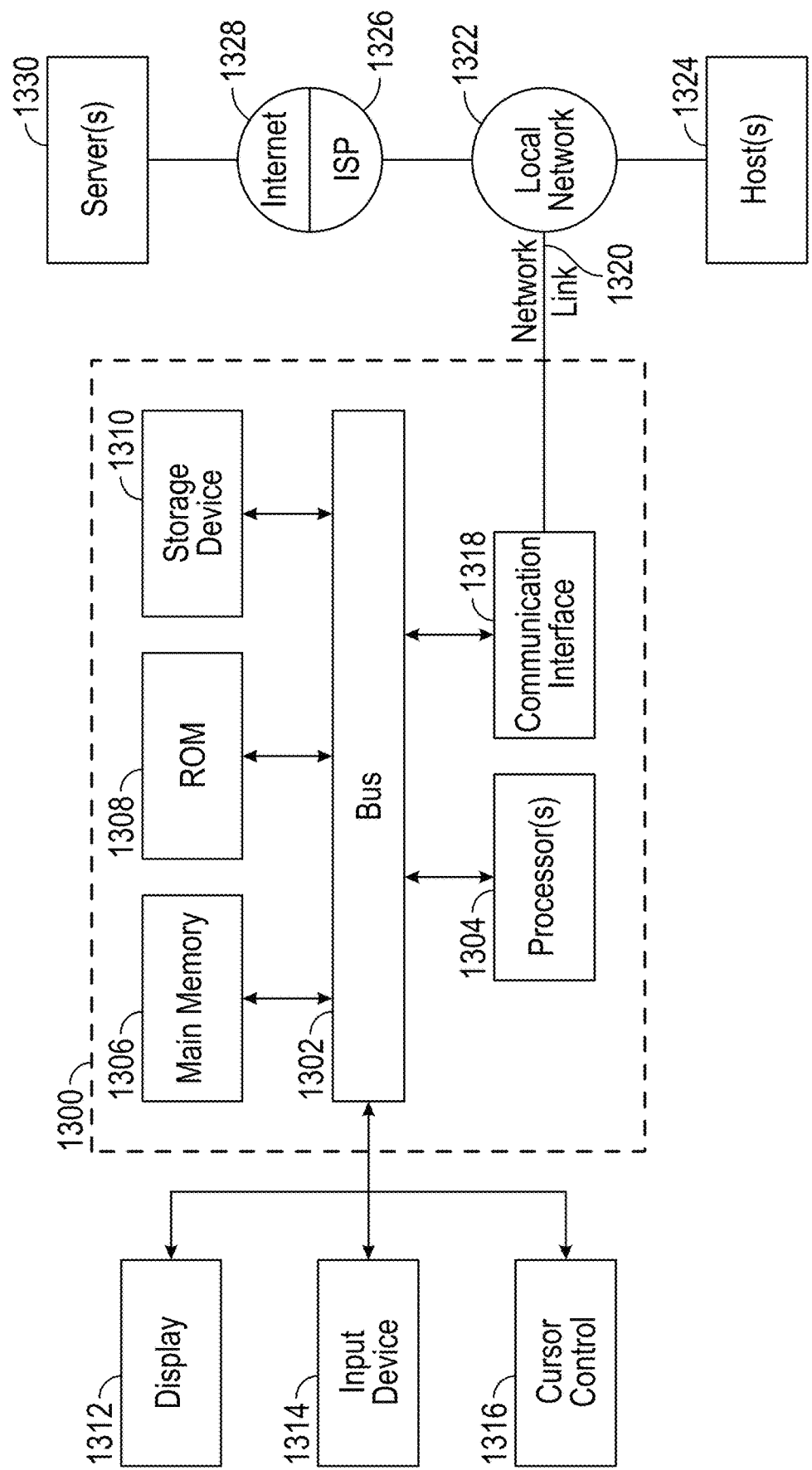
FIG. 13 illustrates an exemplary computer system with which certain methods discussed herein may be implemented.

For example, FIG. 13 shows a block diagram that illustrates a computer system 1300 upon which an embodiment may be implemented. For example, the computing system 1300 may comprise a system for searching for resources and related documents using data structures. Other computing systems discussed herein may include any portion of the circuitry and/or functionality discussed with reference to system 1300. For instance, the system 700, 800, and/or 900 can each include some or all of the components and/or functionality of the system 1300. The system 700, 800, and/or 900 may also each include some or all of the components and/or functionality of components (or systems) described 11-12 (e.g., the database system 1210).

Computer system 1300 includes a bus 1302 or other communication mechanism for communicating information, and a hardware processor, or multiple processors, 1304 coupled with bus 1302 for processing information. Hardware processor(s) 1304 may be, for example, one or more general purpose microprocessors.

Computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

Computer system 1300 further includes a read only memory (ROM) 1208 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

Computer system 1300 may be coupled via bus 1302 to a display 1312, such as a cathode ray tube (CRT) or LCD display (or touch screen), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to communicate with a WAN). Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system configured to provide an interactive user interface and process one or more data sets in response to inputs received via the interactive user interface in order to search and analyze transaction data within one or more databases, the system comprising:
   one or more hardware computer processors configured to execute software code stored in at least one tangible storage device in order to cause the system to:
      process data involving a user interface that is configured to process information between a user and the databases, the databases containing organized information including object oriented or relationally-structured information associated with the transaction data, wherein at least one of the databases is configured to be accessed via technical queries using a technical search language;
      provide interactive user interface tools in the user interface including at least one of graphical input fields or indicia to perform at least one of predefined or customizable searches of the transaction data as a function of one or more search queries, the graphical input fields or indicia comprising query fields for entering search terms in a free textual format;
      automatically generate technical database queries based on the search terms entered via the query fields;
      search all of the information in the databases based on the automatically generated technical database queries;
      update the user interface responsive to the user searches, wherein the user interface is configured to display the transaction data including one or more representations of the organized information within the user interface, the one or more representations of the organized information corresponding to parameters of the transaction data determinable via the one or more search queries, the representations displayed in the user interface comprising a graphical representation comprising at least a single parent node as a first object and a plurality of child nodes, wherein the representations further comprise displaying in the user interface a plurality of second objects comprising identifying information not identified in the search terms but associated with the parent node or one or more of the child nodes, the second objects comprising attributes associated with resources in which data regarding the second objects is stored, and wherein the user, via interaction with the user interface including the plurality of second objects, selects the resources to search or filter the search to selected resources; and
      in response to selection, in the user interface of the resources to search or filter the search to selected resources:
         perform a secondary search based on the selection of one or more of the resources;
         process the organized information into at least one subset that meets the secondary search; and
         update the user interface to display the at least one subset that meets the secondary search, wherein the subset contains only refined search results provided via the secondary search as a function of search selections by the user.

2. The system of claim 1, wherein the one or more hardware computer processors are further configured in order to cause the system to:
   provide interactive user interface tools including at least one of graphical input fields or graphical indicia that enable a user to further filter the initial search results via input of additional search criteria to obtain filtered secondary results.

3. The system of claim 1, wherein at least one of:
   search results that meet the search criteria are provided in response to the search query, wherein the search results either meet the search criteria or are associated with the identified data that meet the search criteria; or
   the one or more search queries include at least one of personal identification information, location information, parameters of the transaction data, or other information derived from a parameter of a data object.

4. The system of claim 1, wherein the user interface includes at least one of: a pane for displaying at least one of search options or resources to search, a pane for displaying at least one of the identified resources or search results, a pane for displaying information associated with one or more selected resources or search results identified, or other panes for displaying at least one of manipulations of the search results, data objects associated with the search, or data objects graphs associated with the search or the data objects.

5. The system of claim 1, wherein the code is further configured to at least one of:
   in response to selection of one or more secondary attributes for inclusion via the user interface:
      filter the identified resources to a second subset that meets the one or more secondary attributes;
      update the user interface to display the second subset; and
      update at least one of the graphical indicia or display data to reflect information corresponding to the second subset; or
   in response to selection of one or more secondary attributes for exclusion via the user interface:
      filter the identified resources to a second subset that does not meet the one or more secondary attributes;

update the user interface to display the second subset; and update at least one of the graphical indicia or display data to reflect information corresponding to the second subset.

6. The system of claim 1, wherein the search criteria for identifying the search results include at least one of first search criteria relating to a first transaction identifier or second search criteria relating to an attribute of a data object associated with the first transaction identifier.

7. The system of claim 6 wherein at least one of:

some of the first search criteria are based on the properties of other data objects determined as associated with an initially searched resource or object; or the search results include at least one of first information that meets the first search criteria, second information based on a data object associated with the first search criteria or first information, or third information based on an object determined as bearing relation to the first search criteria or first information.

8. The system of claim 1, wherein the code is further configured to:

provide, via the user interfaces, a first custom view including summary data regarding the search results and a second custom view including graphical depiction of object model data associated with the summary data displayed in the first custom view; and provide the user at least one tool to navigate between the first custom view and the second custom view.

9. The system of claim 8 wherein information being displayed in the first custom view and the second custom view is dynamically updated.

10. The system of claim 9 wherein the information being displayed in the first custom view and the second custom view is dynamically updated to at least one of:

reflect at least one of the first search criteria or the second search criteria;

reflect adjustments to at least one of the first search criteria or the second search criteria; or reflect underlying data made during the search.

11. A method for providing an interactive user interface and processing one or more data sets in response to inputs received via the interactive user interface in order to search and analyze transaction data within one or more databases, the method comprising:

processing data involving a user interface that is configured to process information between a user and the databases, the databases containing organized information including object oriented or relationally-structured information associated with the transaction data, wherein at least one of the databases is configured to be accessed via technical queries using a technical search language;

providing interactive user interface tools in the user interface including at least one of graphical input fields or indicia to perform at least one of predefined or customizable searches of the transaction data as a function of one or more search queries, the graphical input fields or indicia comprising query fields for entering search terms in a free textual format;

automatically generating technical database queries based on the search terms entered via the query fields;

searching all of the information in the databases based on the automatically generated technical database queries;

updating the user interface responsive to the user searches, wherein the user interface is configured to display the transaction data including one or more representations of the organized information within the user interface, the one or more representations of the organized information corresponding to parameters of the transaction data determinable via the one or more search queries, the representations displayed in the user interface comprising a graphical representation comprising at least a single parent node as a first object and a plurality of child nodes, wherein the representations further comprise displaying in the user interface a plurality of second objects comprising identifying information not identified in the search terms but associated with the parent node or one or more of the child nodes, the second objects comprising attributes associated with resources in which data regarding the second objects is stored, and wherein the user via interaction with the user interface including the plurality of second objects, selects the resources to search or filter the search to selected resources; and in response to selection, in the user interface, of the resources to search or filter the search to selected resources:

performing a secondary search based on the selection of one or more of the resources;

processing the organized information into at least one subset that meets the secondary search; and updating the user interface to display the at least one subset that meets the secondary search, wherein the subset contains only refined search results provided via the secondary search as a function of search selections by the user.

12. The method of claim 11, further comprising:

providing interactive user interface tools including at least one of graphical input field or graphical indicia that enable a user to further filter the initial search results via input of additional search criteria to obtain filtered secondary results.

13. The method of claim 11, wherein at least one of:

search results that meet the search criteria are provided in response to the search query, wherein the search results either meet the search criteria or are associated with the identified data that meet the search criteria; or the one or more search queries include at least one of personal identification information, location information, parameters of the transaction data, or other information derived from a parameter of a data object.

14. The method of claim 11, wherein the user interface includes at least one of: a pane for displaying at least one of search options or resources to search, a pane for displaying at least one of the identified resources or search results, a pane for displaying information associated with one or more selected resources or search results identified, or other panes for displaying manipulations of the search results, data objects associated with the search, or data objects graphs associated with the search or the data objects.

15. The method of claim 11, further comprising at least one of:

in response to selection of one or more secondary attributes for inclusion via the user interface:

filtering the identified resources to a second subset that meets the one or more secondary attributes;

updating the user interface to display the second subset; and updating the graphical indicia and/or display data to reflect information corresponding to the second subset; or in response to selection of one or more secondary attributes for exclusion via the user interface:

filtering the identified resources to a second subset that does not meet the one or more secondary attributes;

updating the user interface to display the second subset; and updating the graphical indicia and/or display data to reflect information corresponding to the second subset.

16. The method of claim 11, wherein the search criteria for identifying the search results include at least one of first search criteria relating to a first transaction identifier or second search criteria relating to an attribute of a data object associated with the first transaction identifier.

17. The method of claim 16 wherein at least one of:

some of the first search criteria are based on the properties of other data objects determined as associated with an initially searched resource or object; or the search results include at least one of first information that meets the first search criteria, second information based on a data object associated with the first search criteria or first information, or third information based on an object determined as bearing relation to the first search criteria or first information.

18. The method of claim 11, further comprising:

providing, via the user interfaces, a first custom view including summary data regarding the search results and a second custom view including graphical depiction of object model data associated with the summary data displayed in the first custom view; and providing the user at least one tool to navigate between the first custom view and the second custom view.

19. The method of claim 18 wherein information being displayed in the first custom view and the second custom view is dynamically updated.

20. The method of claim 19 wherein the information being displayed in the first custom view and the second custom view is dynamically updated to at least one of:

reflect at least one of the first search criteria or the second search criteria;

reflect adjustments to at least one of the first search criteria or the second search criteria; or reflect underlying data made during the search.

* * * * *

UNITED STATES PATENT AND TRADEMARK OFFICE
CERTIFICATE OF CORRECTION

PATENT NO.         : 10,740,342 B2
APPLICATION NO.    : 15/859167
DATED              : August 11, 2020
INVENTOR(S)        : Timothy Yousaf Page 1 of 1

It is certified that error appears in the above-identified patent and that said Letters Patent is hereby corrected as shown below:

In the Claims

In Column 32 at Line 15 (approx.), In Claim 1, Change "user interface" to --user interface,--.

In Column 34 at Line 15 (approx.), In Claim 11, Change "the user" to --the user,--.

Signed and Sealed this
Thirteenth Day of October, 2020

Andrei Iancu
*Director of the United States Patent and Trademark Office*